United States Patent
Ge et al.

(10) Patent No.: US 9,609,461 B2
(45) Date of Patent: Mar. 28, 2017

(54) RELAY SCHEME BETWEEN NARROW FREQUENCY BAND AND BROAD FREQUENCY BAND DEVICES

(71) Applicant: QUALCOMM Incorporated, San Diego, CA (US)

(72) Inventors: Feng Ge, Highland Park, NJ (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/107,221

(22) Filed: Dec. 16, 2013

(65) Prior Publication Data

US 2015/0172846 A1 Jun. 18, 2015

(51) Int. Cl.
*H04W 4/00* (2009.01)
*H04W 8/00* (2009.01)
(Continued)

(52) U.S. Cl.
CPC ............. *H04W 4/005* (2013.01); *H04L 67/12* (2013.01); *H04W 8/005* (2013.01); *H04W 76/02* (2013.01);
(Continued)

(58) Field of Classification Search
CPC ..... H04W 4/005; H04W 8/005; H04W 48/16; H04W 72/0453; H04W 88/04
See application file for complete search history.

(56) References Cited

U.S. PATENT DOCUMENTS

| 2013/0102244 A1* | 4/2013 | Oh et al. .............. 455/11.1 |
| 2013/0188515 A1* | 7/2013 | Pinheiro et al. ......... 370/254 |

(Continued)

FOREIGN PATENT DOCUMENTS

| WO | WO 2012147270 A1 | 11/2012 |
| WO | WO 2013027014 A1 | 2/2013 |
| WO | WO 2013111104 A1 | 8/2013 |

OTHER PUBLICATIONS

ISA/EPO, International Search Report and Written Opinion of the International Searching Authority, Int'l App. No. PCT/US2014/068566, Mar. 5, 2015, European Patent Office, Rijswijk, NL, 10 pgs.
(Continued)

*Primary Examiner* — Pao Sinkantarakorn
(74) *Attorney, Agent, or Firm* — Holland & Hart LLP

(57) ABSTRACT

Methods, systems, and devices are described for improving uplink communications of machine type communication (MTC) devices. In some embodiments, an MTC device may perform a discovery operation on a first narrow frequency band, establish a first communication link with a discovered relay device on a second narrow frequency band, and transmit MTC data on the second narrow frequency band to the discovered relay device to be relayed to a third device on a second communication link on a broad frequency band. In another embodiment, a first device may participate in a discovery operation with a second device. The first device may establish a communication link with the second device on a first narrow frequency band and receive data from the second device on a second narrow frequency band. The first device may relay the data to a third device over a second communication link on a broad frequency band.

24 Claims, 15 Drawing Sheets

(51) Int. Cl.
*H04W 76/02* (2009.01)
*H04L 29/08* (2006.01)
H04W 72/04 (2009.01)
H04W 72/02 (2009.01)
H04W 88/04 (2009.01)
H04W 48/20 (2009.01)

(52) U.S. Cl.
CPC ............ *H04W 48/20* (2013.01); *H04W 72/02* (2013.01); *H04W 72/0453* (2013.01); *H04W 88/04* (2013.01)

(56) References Cited

U.S. PATENT DOCUMENTS

| | | |
|---|---|---|
| 2013/0294399 A1* | 11/2013 | Lee ................................ 370/330 |
| 2013/0301552 A1 | 11/2013 | Xu et al. |
| 2013/0324114 A1 | 12/2013 | Raghothaman et al. |
| 2015/0092694 A1* | 4/2015 | You et al. ..................... 370/329 |
| 2015/0237555 A1* | 8/2015 | Kashiwase ............ H04W 36/30 370/329 |

OTHER PUBLICATIONS

Kim et al., "Optimal Relaying Strategy for UE Relays," 2011 17th Asia-Pacific Conference on Communications (APCC), Sabah, Malaysia, Oct. 2-5, 2011, pp. 192-196, XP032115953, ISBN: 978-1-4577-0389-8, Institute of Electrical and Electronics Engineers.

* cited by examiner

RELAY SCHEME BETWEEN NARROW FREQUENCY BAND AND BROAD FREQUENCY BAND DEVICES

BACKGROUND

The following relates generally to wireless communication, and more specifically to improving uplink communications for Machine-to-Machine (M2M) communication or Machine Type Communication (MTC) devices. M2M or MTC refers to data communication technologies that allow automated devices to communicate with one another without human intervention. For example, M2M and/or MTC may refer to communications from devices that integrate sensors or meters to measure or capture information and relay that information to a central server or application program that can make use of the information or present the information to humans interacting with the program or application. These devices may be called M2M devices, MTC devices and/or MTC user equipments (UEs).

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, etc. The market for MTC devices is expected to grow rapidly as industries such as automotive, security, healthcare, and fleet management employ MTC to increase productivity, manage costs, and/or expand customer services.

MTC devices may use a variety of wired and/or wireless communication technologies. For example, MTC devices may communicate with a network over various wireless cellular technologies, such as LTE and/or various wireless networking technologies (e.g., IEEE 802.11 (Wi-Fi), IEEE 802.16 (WiMAX), etc.). MTC devices may also communicate with one another using various peer-to-peer technologies such as LTE-Direct (LTE-D), Bluetooth, ZigBee, and/or other ad-hoc or mesh network technologies. The expansion of multiple access wireless networks around the world has made it far easier for MTC communication to take place and has lessened the amount of power and time for information to be communicated between machines.

Further, MTC devices generally must be power efficient and low-cost; therefore, they usually are not equipped with a power amplifier (PA) or they may have a small PA, which limits the MTC's range for communicating. MTC devices may use a narrow frequency band transceiver. As a result, MTC devices may have link budget challenges, particularly for uplink communications to a base station or eNB, for example.

SUMMARY

The described features generally relate to one or more improved systems, methods, and/or apparatuses for improving uplink communications of a machine type communication (MTC) device. In one example, an MTC device may perform a discovery operation on a first narrow frequency band to identify devices that may serve as a relay. A communication link may be set up between the MTC device and a discovered relay device on a second narrow frequency band. The MTC device may transmit MTC data on the second narrow frequency band to the discovered relay. The relay device may then forward the MTC data to another device on a communication link on a broad frequency band.

In some embodiments, a method of wireless communication may include performing, by a first wireless device, a discovery operation on a first narrow frequency band. The first wireless device may establish a first communication link with a discovered second wireless device on a second narrow frequency band. The first wireless device may then transmit data on the second narrow frequency band to the discovered second wireless device with the data to be relayed by the discovered second wireless device to a third device on a second communication link on a broad frequency band. In some embodiments, the first wireless device is a machine type communication (MTC) device.

In some embodiments, the first communication link on the second narrow frequency band and the second communication link on the broad frequency band overlap in time. At least one of the first narrow frequency band or the second narrow frequency band may be a subset of the broad frequency band. In some cases, the first narrow frequency band and the second narrow frequency band may be the same. The second narrow frequency band may be common to a plurality of narrow frequency band wireless devices. At least one of the first narrow frequency band or the second narrow frequency band may be predefined or randomly selected by the first wireless device.

In some cases, the first wireless device may perform synchronization with the third device.

In some embodiments, at least one of the first narrow frequency band or the second narrow frequency band may have a bandwidth in the range of 1.4 MHz to 3 MHz and the broad frequency band may have a bandwidth of approximately 5 MHz, 10 MHz, or 20 MHz. In some cases, the first communication link may be an LTE-D connection, while the second communication link on the broad frequency band may be an LTE connection.

A machine type communications (MTC) device is also described. The MTC device may include a processor, a memory in electronic communication with the processor, and instructions stored in the memory. The instructions may be executable by the processor to perform a discovery operation on a first narrow frequency band and establish a first communication link with a discovered second wireless device on a second narrow frequency band. The instructions may also be executable by the processor to enable the MTC device to transmit data on the second narrow frequency band to the discovered second wireless device with the data to be relayed by the discovered second wireless device to a third device on a second communication link on a broad frequency band. In some cases, at least one of the first narrow frequency band or the second narrow frequency band is a subset of the broad frequency band.

In other embodiments, a method of wireless communication may include participating, by a first wireless device, in a discovery operation and establishing a first communication link with a second wireless device involved in the discovery operation on a first narrow frequency band. The first device may receive data on a second narrow frequency band from the second wireless device and relay the received data to a third device via a second communication link on a broad frequency band. In some embodiments, the second wireless device is a machine type communication (MTC) device.

In some embodiments, the method may include the first wireless device sending a discovery message on the first narrow frequency band to initiate the discovery operation. In some cases, the first wireless device may send a discovery message on a common narrow frequency band to multiple wireless devices to initiate the discovery operation. In other cases, the first wireless device may send a discovery message on multiple different narrow frequency bands to multiple wireless devices to initiate the discovery operation.

In some embodiments, the first wireless device may monitor the first narrow frequency band for a predetermined time for a response message from the second wireless device. In some cases, the second wireless device may initiate the discovery operation.

In some embodiments, at least one of the first narrow frequency band or the second narrow frequency band may be a subset of the broad frequency band. In some cases, the first narrow frequency band and the second narrow frequency band may be the same. The second narrow frequency band may be common to a plurality of narrow frequency band wireless devices. At least one of the first narrow frequency band or the second narrow frequency band may be predefined or randomly selected by the first wireless device.

In some embodiments, at least one of the first narrow frequency band or the second narrow frequency band may have a bandwidth in the range of 1.4 MHz to 3 MHz and the broad frequency band may have a bandwidth of approximately 5 MHz, 10 MHz, or 20 MHz. In some cases, the first communication link may be an LTE-D connection, while the second communication link on the broad frequency band may be an LTE connection.

A device for relaying MTC data is also described. The device may include a processor, memory in electronic communication with the processor, and instructions stored in the memory. The instructions may be executable by the processor to participate in a discovery operation and establish a first communication link with a second wireless device involved in the discovery operation on a first narrow frequency band. The instructions may also be executable by the processor to enable the device to receive data on a second narrow frequency band from the second wireless device and relay the received data to a third device via a second communication link on a broad frequency band. In some cases, at least one of the first narrow frequency band or the second narrow frequency is a subset of the broad frequency band.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the corresponding description is applicable to any one of the similar components having the same first reference label irrespective of the second reference label.

DETAILED DESCRIPTION

Figure 1:
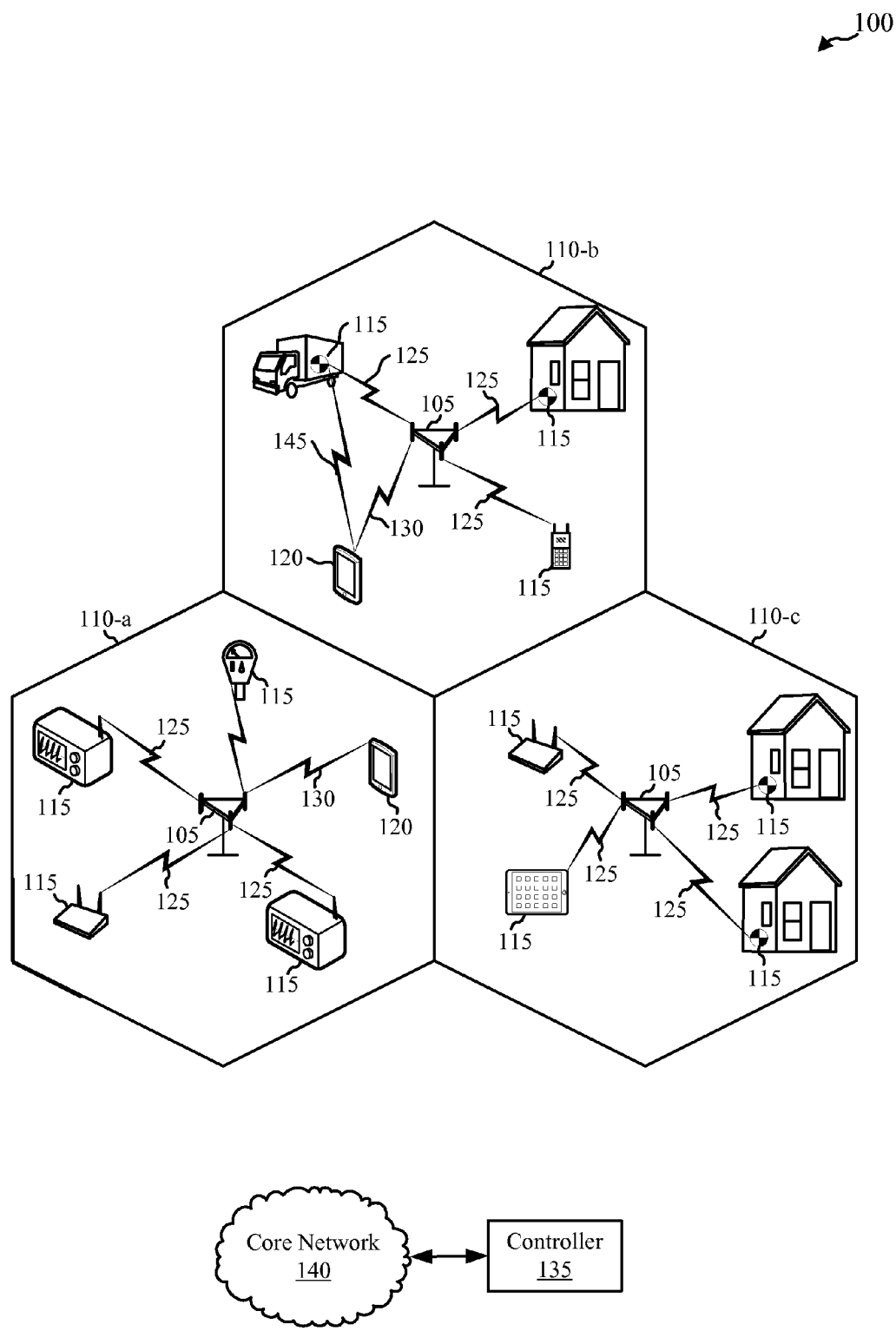
FIG. 1 shows a block diagram of a wireless communications system in accordance with various embodiments.

The described features generally relate to one or more improved systems, methods, and/or apparatuses for improving uplink communications of a machine type communication (MTC) device. The MTC device may transmit MTC data to a relay device on a narrow frequency band. The relay device may forward the MTC data to another device on a broad frequency band. In some cases, the relay device may be a mobile device or user equipment (UE). The relay device may be capable of communicating over one or more narrow frequency bands to receive the MTC data. In one example, the relay device may forward the MTC data to a base station or Evolved-NodeB (eNB). The relay device may communicate the MTC data to the base station over a broad frequency band. The base station may be in communication with an MTC server that regularly or periodically communicates with one or more MTC devices.

In one aspect, an MTC device may participate in a discovery operation on a first narrow frequency band to discover one or more relay devices. In some cases, a relay device may transmit a discovery message to one or more MTC devices to initiate discovery on the first narrow frequency band. In other cases, the MTC device may initiate the discovery operation by sending or broadcasting one or more discovery signals to potential relay devices.

The first narrow frequency band may be pre-defined, randomly selected by the MTC device, or chosen by other similar means. The MTC device may establish a first communication link with a discovered relay device on a second narrow frequency band. In some cases, the first narrow frequency band may be the same as the second narrow frequency band. The second narrow frequency band may be common to a plurality of narrow frequency band wireless devices, such as multiple MTC devices. The MTC device may then transmit MTC data on the second narrow frequency band to the discovered relay device. The MTC data may be relayed, by the relay device, to another device on a second communication link on a broad frequency band. In some cases the first and/or second narrow frequency band may be a subset of the broad frequency band of the second communication link. As a result, the narrow and broad frequency bands may occupy the same frequency resources. Because of the shared resources between the narrow and broad frequency bands, the relay device may communicate over both the narrow frequency band and the broad frequency band concurrently (i.e., the relay device may have active links with both an MTC device and a base station at the same time.) In some cases, communications over the narrow frequency band and the broad frequency band may occur at different times. In some embodiments, communications over the narrow frequency band and the broad frequency band may overlap in time.

Thus, the following description provides examples, and is not limiting of the scope, applicability, or configuration set forth in the claims. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105, communication devices 115, 120, a base station controller 135, and a core network 140 (the controller 135 may be integrated into the core network 140). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The base stations 105 may wirelessly communicate with the devices 115, 120 via a base station antenna (not shown). The base stations 105 may communicate with the devices 115, 120 under the control of the base station controller 135 via multiple carriers. Each of the base station 105 sites may provide communication coverage for a respective geographic area or cell 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area (or cell) for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115, 120 may be dispersed throughout the coverage areas 110. Each device 115, 120 may be stationary or mobile. In one configuration, the devices 115, 120 may be able to communicate with different types of base stations such as, but not limited to, macro base stations, pico base stations, and femto base stations, via links 125, 130, 145 respectively.

Some of the devices 115 may be machine type communication (MTC) devices 115 that perform various functions, capture information, and/or communicate information with limited or no human intervention. For example, MTC devices 115 may include sensors and/or meters for monitoring and/or tracking other devices, environmental conditions, etc. MTC devices 115 may be standalone devices or, in other embodiments, MTC devices 115 may be modules incorporated in other devices, such as relay devices 120, which may in some cases be mobile devices or user equipments (UEs). For example, relay devices 120 such as smart phones, cellular phones and wireless communications devices, personal digital assistants (PDAs), tablets, other handheld devices, netbooks, ultrabooks, smartbooks, notebook computers, surveillance cameras, handled medical scanning devices, home appliances, etc. may include one or more MTC device modules. In other cases, relay devices 120 may not implement any MTC functionality. In the ensuing description, various techniques are described as applied to communications and processing for a system 100 including a network and one or more MTC devices 115. It should be understood that the described techniques may be advantageously applied to other devices such as those incorporating MTC devices 115 and/or other wireless communication devices.

In some embodiments, an MTC device 115 may communicate with a base station 105 by transmitting information through a relay device 120 on one or more narrow frequency bands to be relayed to a base station 105 on a broad frequency band. In some cases, the MTC device 115 may relay uplink data to a base station 105 through narrow frequency band link 145 to a relay device 120. The relay device 120 may then forward the MTC data to the base station 105 via broad frequency band link 130. The base station 105 may also communicate directly with the MTC device 115 via link 125.

The information collected by the MTC devices 115 may be transmitted across a network that includes components of system 100 to a back-end system, such as a server. The transmission of data to/from the MTC devices 115 may be routed through the base stations 105. The base stations 105 may communicate with the MTC devices 115 on a forward or downlink link for transmitting signaling and/or information to the MTC devices 115 and a reverse or uplink link for receiving signaling and/or information from the MTC devices 115.

In one example, the network controller 135 may be coupled to a set of base stations 105 and provide coordination and control for these base stations 105. The controller 135 may communicate with the base stations 105 via a backhaul (e.g., core network 140). The base stations 105 may also communicate with one another directly or indirectly and/or via wireless or wireline backhaul.

The different aspects of system 100, such as the MTC devices 115, the relay devices 120, the base stations 105, the core network 140, and/or the controller 135 may be configured for improving uplink communications of an MTC device 115. In one configuration, a relay device 120 may relay communications received from the MTC device 115 to a second device, such as a base station 105. The communications may be transmitted from the MTC device 115 to the relay device 120 via narrow frequency band link 145. The relay device 120 may relay the communications to the base station 105 via broad frequency band link 130.

In one aspect, an MTC device 115 may initiate a discovery operation on a first narrow frequency band. In another aspect, the relay device 120 may initiate discovery on a first narrow frequency band by transmitting a discovery message to one or more MTC devices 115. The first narrow frequency band may be a common narrow frequency to multiple MTC devices 115. As a result, the discovery process may be initiated by an MTC device 115 or a relay device 120. Following discovery, communications may be established between the relay device 120 and the MTC device 115. The relay device 120 may receive MTC data from the MTC device 115 over a communication link 145 on a second narrow frequency band. The relay device 120 may then relay the MTC data to a base station 105 over a second communication link 130 on a broad frequency band.

In some cases, the first and/or second narrow frequency band of communication link 145 may have a bandwidth in the range from 1.4 to 3 MHz, while the broad frequency band of communication link 130 may have a bandwidth of 5 MHz, 10 MHz, 20 MHz, or other wide frequency bandwidth.

Figure 2:
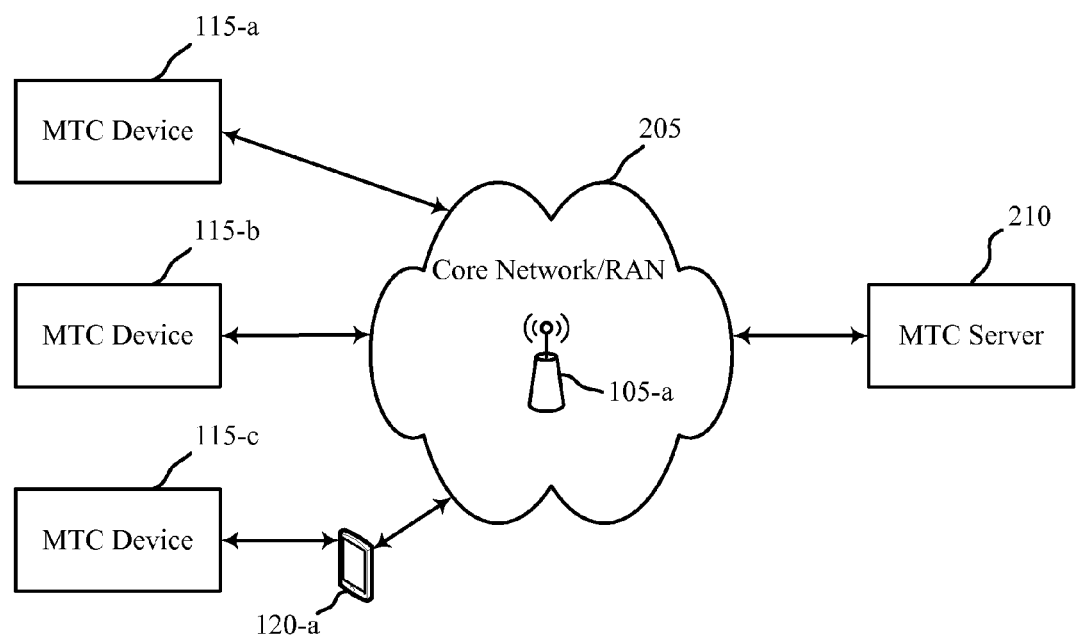
FIG. 2 illustrates an example of a wireless communication system implementing MTC service in accordance with various embodiments.

FIG. 2 illustrates an example of a wireless communication system 200 including a Radio Access Network (RAN) or Core Network 205 implementing a machine type communication service according to one aspect. The system 200 may include any number of MTC devices 115, however for ease of explanation only three MTC device 115-a, 115-b, and 115-c are shown in communication with an MTC server 210. Communications between the server 210 and MTC devices 115-a, 115-b, and 115-c may be routed through a base station 105-a that may be considered part of the Core Network/RAN 205. The base station 105-a may be an example of the base stations 105 illustrated in FIG. 1. The MTC devices 115-a, 115-b, and 115-c may be examples of the MTC devices 115 illustrated in FIG. 1, or may be examples of modules of the relay devices 120 illustrated in FIG. 1. One skilled in the art would understand that the quantity of MTC devices 115, Core Networks/RANs 205, and MTC servers 210 shown in FIG. 2 is for illustration purposes only and should not be construed as limiting.

The wireless communication system 200 may be operable to facilitate machine type communication between one or more MTC devices 115 and/or one or more base stations 105-a. Machine type communication may include communications between one or more devices without human intervention. In one example, machine type communication may include the automated exchange of data between a remote machine, such as an MTC device 115-a, 115-b, 115-c, and a back-end IT infrastructure, such as the MTC server 210, without user intervention. The transfer of data from an MTC device 115-a, 115-b, 115-c to the MTC server 210 via the Core Network/RAN 205 (e.g., the base station 105-a) may be performed using reverse or uplink link communications. Data collected by the MTC devices 115-a, 115-b, 115-c (e.g., monitoring data, sensor data, meter data, etc.) may be transferred to the MTC server 210 on the uplink communications.

The transfer of data from the MTC server 210 to an MTC device 115-a via the base station 105-a may be performed via forward or downlink link communications. The forward link may be used to send instructions, software/firmware updates, and/or messages to the MTC devices 115-a, 115-b, 115-c. The instructions may instruct the MTC devices 115-a, 115-b, 115-c to remotely monitor equipment, environmental conditions, etc. Machine type communication may be used with various applications such as, but not limited to, remote monitoring, measurement and condition recording, fleet management and asset tracking, in-field data collection, distribution, physical access control, and/or storage, etc. The base station 105-a may generate one or more forward link frames with a small number of channels to transmit instructions, software/firmware updates, and/or messages. The various MTC devices 115-a, 115-b, 115-c may wake up to monitor a specific frame when instructions or other data is included on a channel of that frame.

In one embodiment, the behavior of the MTC devices 115-a, 115-b, 115-c may be pre-defined. For example, the day, time, etc. to monitor another device and transmit the collected information may be pre-defined for an MTC device 115-a, 115-b, 115-c. For example, the MTC device 115-a may be programmed to begin monitoring another device and collect information about that other device at a first pre-defined time period. The MTC device 115-a may also be programmed to transmit the collected information at a second pre-defined time period. The behavior of an MTC device 115-a may be remotely programmed to the device 115-a.

In some embodiments, one or more MTC devices 115-a, 115-b, 115-c may have data to send to the MTC server 210, for example through the core network/RAN 205 via base station 105-a. In other cases, the MTC server 210 may request data from the one or more MTC devices 115-a, 115-b, 115-c. In either case, an MTC device 115-a, 115-b, 115-c may have uplink data to communicate to a base station 105-a to be relayed to the MTC server 210. Given that MTC devices 115-a, 115-b, 115-c may be narrow frequency band devices and/or have limited power resources, they may not be able to effectively and timely communicate data on the uplink to a base station 105-a and/or the MTC server 210. Communications, and particularly uplink communications of an MTC device 115-a, 115-b, 115-c may be improved by relaying MTC data to a relay device 120-b over a narrow frequency band, with the MTC data being forwarded by the relay device 120-b to the base station 105-a and/or the Core Network/RAN 205 via a broad frequency band. These relay techniques will be described in further detail below in reference to FIGS. 3-7.

Figure 3:
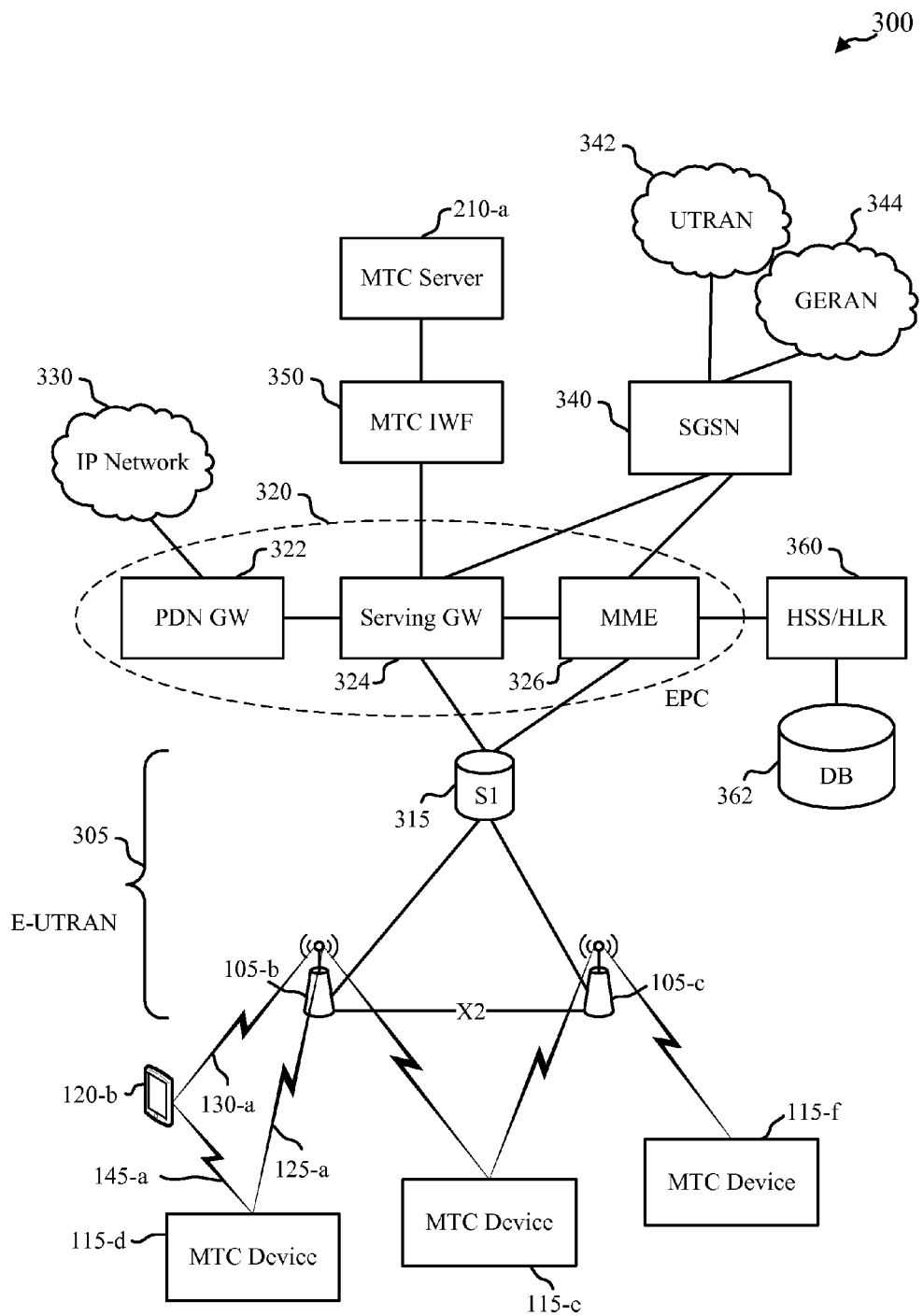
FIG. 3 illustrates another example of a wireless communication system implementing MTC service in accordance with various embodiments.

FIG. 3 illustrates an example of a wireless communications system 300 implementing a machine type communication service over an LTE/LTE-Advanced network in accordance with various embodiments. The LTE/LTE-A network may include Evolved Universal Terrestrial Radio Access Network (E-UTRAN) 305 and Evolved Packet Core (EPC) 320. The LTE E-UTRAN 305 and EPC 320 may be configured for supporting end-to-end packet-switched communications. EPC 320 may include a Packet Data Network (PDN) Gateway 322. The PDN Gateway 322 may be connected to one or more Internet Protocol (IP) Networks 330. IP Networks 330 may include Operator IP Networks as well as external IP Networks. For example, IP Networks 330 may include the Internet, one or more Intranets, an IP Multimedia Subsystem (IMS), and a Packet Switched (PS) Streaming Service (PSS). The PDN Gateway 322 may provide UE IP address allocation as well as other functions. The EPC 320 may interconnect with other access networks using other Radio Access Technologies (RATs). For example, EPC 320 may interconnect with UTRAN 342 and/or GERAN 344 via one or more Serving GPRS Support Nodes (SGSNs) 340.

EPC 320 may include one or more Serving Gateways 324 and/or Mobility Management Entities (MME) 326. The Serving Gateway 324 may handle the interface to E-UTRAN 305 and provide a communication point for inter-RAT mobility (e.g., handover to UTRAN 342 and/or GERAN 344, etc.). Generally, the MME 326 may provide bearer and connection management while the Serving Gateway 324 may transfer user IP packets between base stations 105 and other network end-points (e.g., PDN GW 322, etc.). For example, MME 326 may manage intra-RAT mobility functions (e.g., Serving Gateway selection) and/or UE tracking management. The Serving Gateway 324 and the MME 326 may be implemented in one physical node of EPC 320 or in separate physical nodes. A Home Subscriber Service (HSS) and/or home location register (HLR) node 360 may provide service authorization and/or user authentication for UEs. HSS/HLR node 360 may communicate with one or more databases 362.

E-UTRAN 305 may include one or more base stations or eNBs 105-b, 105-c which provide user and control plane protocol terminations for MTC devices 115-d, 115-e, 115-f, and/or a relay device or UE 120-b over the air interface of the LTE network. Base stations 105-b, 105-c may be connected with an X2 interface for intra-eNB communication. Base stations 105-b, 105-c may be connected to Serving Gateway 324 and/or MME 326 over an S-1 interface 315 for communicating data traffic and/or control plane information. The MTC devices 115-d, 115-e, 115-f, and/or the relay device 120-b may be configured to collaboratively communicate with multiple base stations 105 through, for example, Multiple Input Multiple Output (MIMO), Coordinated Multi-Point (CoMP), or other schemes as described in more detail below. The MTC devices 115-d, 115-e, 115-f may be examples of the MTC devices 115 of FIGS. 1 and/or 2. Similarly, the base stations 105-b, 105-c may be examples of the base station 105 of FIGS. 1 and/or 2.

In some embodiments, wireless communications system 300 includes an MTC inter-working function (IWF) module 350, which may provide an interface between EPC 320 and one or more external MTC Servers 210-a for providing MTC service within the LTE network. MTC server 210-a may be an example of MTC server 210 of FIG. 2. MTC server 210-a may be operated by the proprietor of MTC devices 115 and may perform functions associated with deployment of MTC devices 115 such as receiving and processing MTC device data. MTC server 210-a may be connected directly to EPC 320 or may be connected through MTC IWF module 350 and/or other networks such as the Internet. MTC IWF module 350 may be implemented in one or more existing physical nodes of the EPC 320 (e.g., Serving Gateway 324, etc.), or in a separate physical node connected to EPC 320.

Wireless communications system 300 may further support relay of communications from an MTC device 115-d to a base station 105-b through a relay device 120-b. In one aspect, an MTC device 115-d may perform a discovery operation on a first narrow frequency band. The MTC device 115-d may then establish a first communication link 145-a with a discovered relay device 120-b on a second narrow frequency band. In some cases, the first narrow frequency band may be the same as the second narrow frequency band. The second narrow frequency band may be common to a plurality of narrow frequency band wireless devices, such as multiple MTC devices 115. The MTC device 115-d may then transmit MTC data on the first communication link 145-a to the discovered relay device 120-b. The relay device 120-b may then relay the MTC data to a base station 105-b on a second communication link 130-a, which may be on a broad frequency band. In some cases the first and/or second narrow frequency band of the first communication link 145-a may be a subset, e.g., within, the broad frequency band of the second communication link 130-a. As a result of the narrow and broad frequency bands occupying the same frequency resources, communications over both the second frequency band via the first communication link 145-a and the broad frequency band via the second communication link 130-a by the relay device 120-b may overlap in time.

Figure 4:
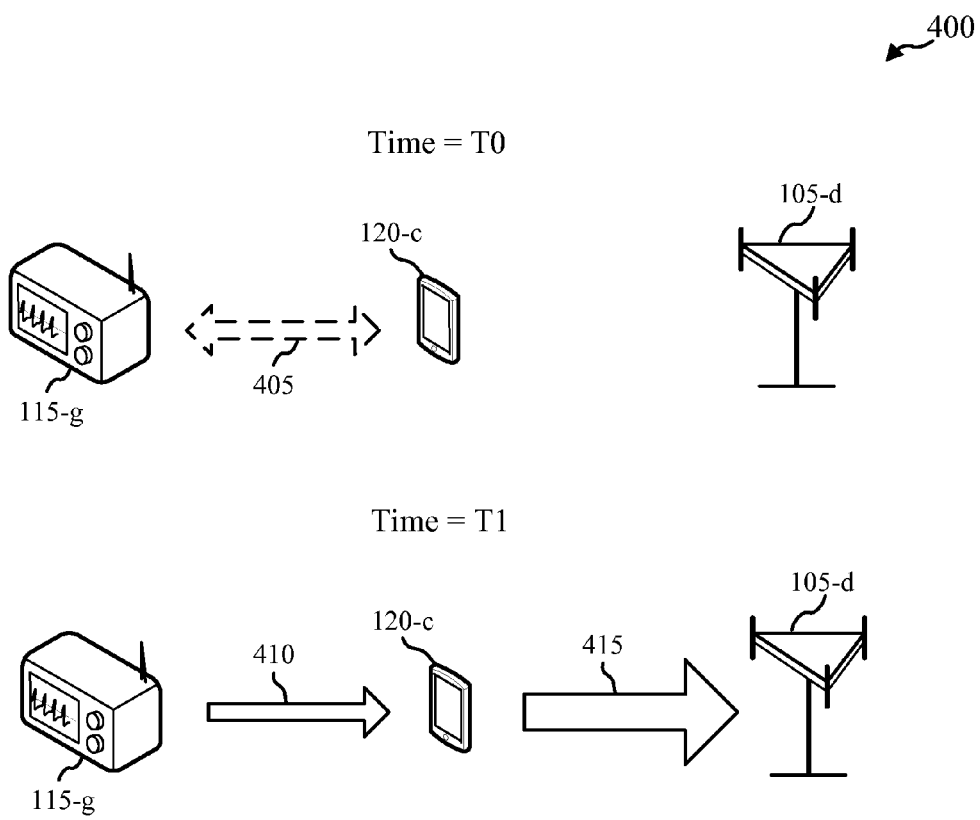
FIG. 4 illustrates an example of wireless communications of an MTC device, a relay device, and a base station in accordance with various embodiments.

FIG. 4 illustrates an example of wireless communications 400 between an MTC device 115-g, a relay device 120-c, and a base station 105-d in accordance with various embodiments. The MTC device 115-g may be an example of the MTC device 115 of FIGS. 1, 2, and/or 3. The relay device 120-c may be an example of the relay device or UE 120 of FIGS. 1 and/or 3. The base station 105-d, which may be a cellular base station, eNB, or WLAN access point, may be an example of base station 105 of FIGS. 1, 2, an/or 3. The MTC device 115-g may first engage in a discovery process by sending/receiving one or more discovery messages to/from a relay device 120-c at time T0.

In some cases, the MTC device 115-g may initiate the discovery process, for example if it has data to transmit to a base station 105-d and/or MTC server 210, by sending a discovery signal to the relay device 120-c over a first narrow frequency band 405. In some cases, the MTC device 115 may select the first narrow frequency band 405 or the first narrow frequency band 405 may be predetermined and known by relay devices 120-c. In this scenario, the relay device 120-c may then respond to the discovery signal via the same first narrow frequency band 405.

In other cases, the relay device 120-c may initiate the discovery process, for example, by broadcasting a discovery signal on the first narrow frequency band 405, which may be common to a plurality of MTC devices. The MTC device 115-g may listen to the first narrow frequency band 405 and respond to the discovery signal over the same first narrow frequency band 405.

Following the discovery process at time T1, the MTC device 115-g and the relay device 120-c may establish a first link, such as an access link, over a second narrow frequency band 410. In some cases the second narrow frequency band 410 may be the same as the first narrow frequency band 405. In one configuration, the access link may be an LTE-D connection.

The MTC device 115-g may transmit data over the access link via the second narrow frequency band 410 to the relay device 120-c to be relayed to the base station 105-d. The relay device 120-c may establish, or in some cases have already established, a second communication link, or relay link, with the base station 105-d utilizing a broad frequency band 415. The relay device 120-c may forward the MTC data to the base station 105-d via the broad frequency band 415 of the relay link. In one configuration, the relay link is an LTE connection.

In some cases, communications over narrow frequency band 410 and broad frequency band 415 may happen concurrently so that the relay device 120-c may maintain active connections with the MTC device 115-g and the base station 105-d simultaneously. As a result, MTC data may be relayed to a base station 105-d with little impact on the operation of the relay device or UE 120-c.

In some embodiments, discovery signaling over the first narrow frequency band 405 and/or uplink data transmitted from the MTC device 115-g to the relay device 120-c over the second narrow frequency band 410 may be communicated via link 145 described above in reference to FIGS. 1 and/or 3. Similarly, the MTC data forwarded from the relay device 120-c to the base station 105-d over the broad frequency band 415 may be communicated via link 130 described above in reference to FIGS. 1 and/or 3.

Figure 5:
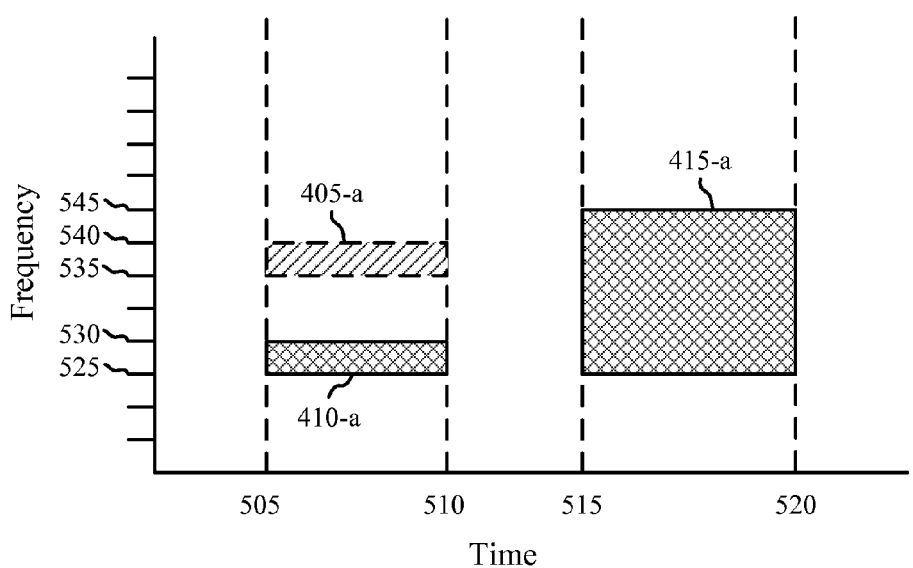
FIG. 5 shows a time-frequency diagram of MTC communications of FIG. 4 in accordance with various embodiments.

FIG. 5 illustrates a time-frequency diagram 500 of communications between the MTC device 115-g, the relay device 120-c, and the base station 105-d of FIG. 4. In one embodiment, the MTC device 115-g may engage with, e.g., send/receive discovery messages to/from the relay device 120-c over narrow frequency band 405-a. Narrow frequency band 405-a may correspond to the first narrow frequency band 405 described in reference to FIG. 4. Communications over narrow frequency band 405-a may begin at time 505 and end at time 510, for example representing time spent in the discovery process. Frequency band 405-a may span a frequency bandwidth from a first frequency 535 to a second frequency 540, which may represent, for example a bandwidth of 1.4 MHZ. In one embodiment, the first frequency 535 may be 1923 MHz and the second frequency 540 may be 1924.4 MHz. In other embodiments, frequency band 405-a may span different bandwidths and on different frequencies according to the operation or configuration of the MTC device 115-g and the relay device 120-c, etc.

In some embodiments, communications from the MTC device 115-g to the relay device 120-c over the second narrow frequency band may be represented by second narrow frequency band 410-a. Second narrow frequency band 410-a may be an example of the second narrow frequency band 410 described in reference to FIG. 4. Communications over the second narrow frequency band 410-a may begin at time 505 and end at time 510. The time period for communications over the second narrow frequency band 410-a may represent the transmission time of MTC data from the MTC device 115-g to the relay device 120-c. Second narrow frequency band 410-a may span a frequency bandwidth from a first frequency 525 to a second frequency 530, which may represent, for example a bandwidth of 1.4 MHZ. In one embodiment, first frequency 525 may represent 1920 MHz and second frequency 530 may represent 1921.4 MHz. In other embodiments, second narrow frequency band 410-a may span different bandwidths and on different frequencies according to the operation or configuration of the MTC device 115-g and the relay device 120-c, etc.

Once the relay device 120-c receives the MTC data to be forwarded/relayed to the base station 105-d, or concurrently therewith, the relay device 120 may transmit the MTC data to the base station 105-d via a broad frequency band 415-a. Broad frequency band 415-a may be an example of the broad frequency band 415 described in reference to FIG. 4. Communications over the broad frequency band 415-a may begin at time 515 and end at time 520. Broad frequency band 415-a may span a frequency bandwidth from first frequency 525 to second frequency 545, which may represent, for example a bandwidth of 5 MHZ. In one embodiment, the first frequency 525 may represent 1920 MHz and the second frequency 545 may represent 1925 MHz.

In other embodiments, broad frequency band 415-a may span different bandwidths and on different frequencies according to the operation or configuration of the MTC device 115-g and the relay device 120-c. In one configuration, the broad frequency band 415-a may encompass both the first narrow frequency band 405-a used for discovery and the second narrow frequency band 410-a used to transmit MTC data from the MTC device 115-g to the relay device 120-c. As a result, the relay device 120-c may communicate to both the MTC device 115-g and the base station 105-d using concurrently active links, such as links 145 and 130 described above in reference to FIGS. 1 and/or 3.

In some embodiments, communications over frequency bands 410-a and 415-a may occur at the same time. In other cases, communications over frequency bands 410-a and 415-a may occur at different times.

In some cases, discovery signaling over a first narrow frequency band 405-a and/or uplink data transmitted from the MTC device 115-g to the relay device 120-c over the second narrow frequency band 410-a may be communicated via link 145 described above in reference to FIGS. 1 and/or 3. Similarly, the MTC data forwarded from the relay device 120-c to the base station 105-d over the broad frequency band 415-a may be communicated via link 130 described above in reference to FIGS. 1 and/or 3.

Figure 6:
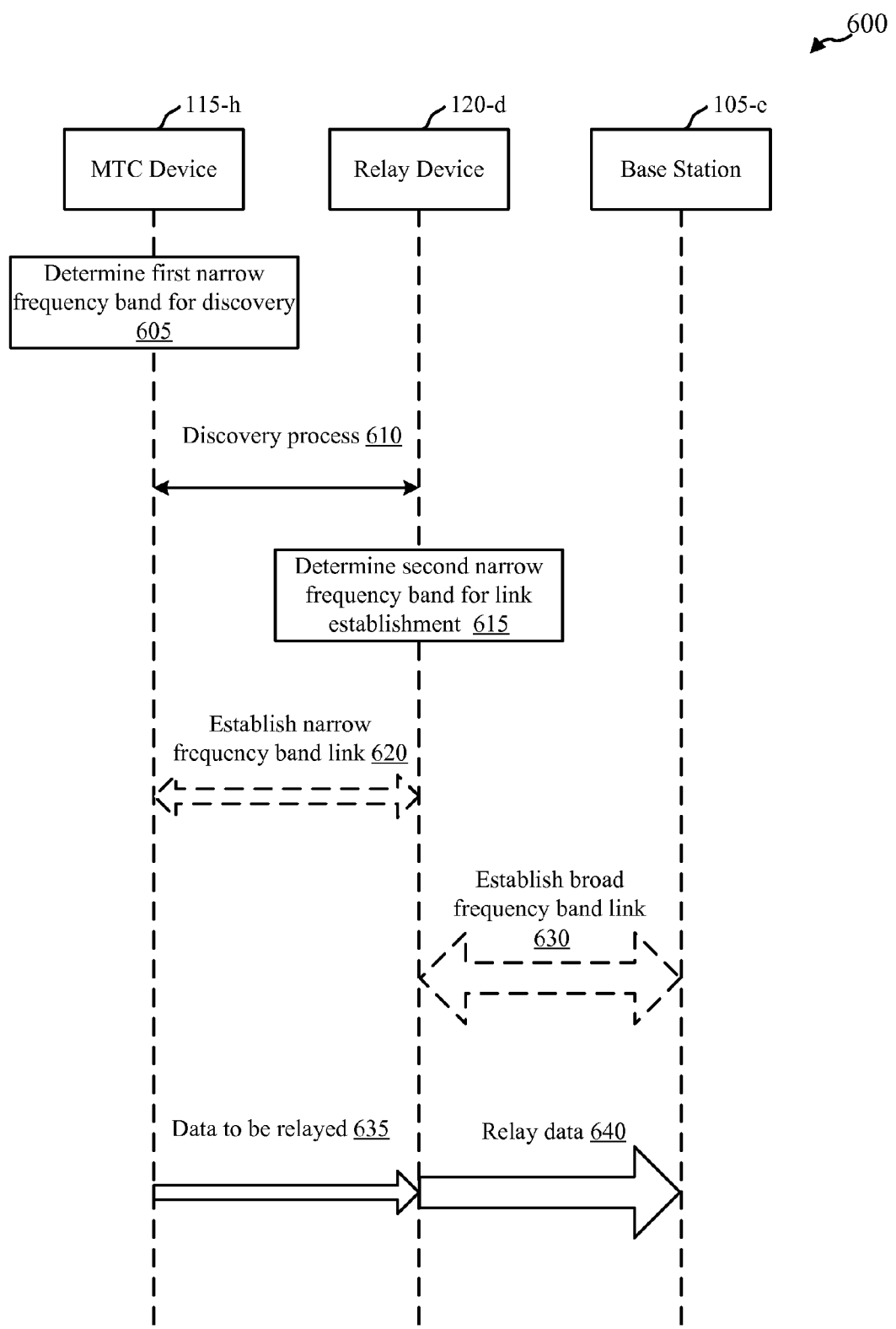
FIG. 6 shows a flow diagram for relaying communications of an MTC device through a relay device over a narrow frequency band to a base station on a broad frequency band in accordance with various embodiments.

Turning next to FIG. 6, a flow diagram 600 illustrates an example of an MTC device 115-h relaying communications to a base station 105-e through a relay device 120-d in accordance with various embodiments. The MTC device 115-h may be an example of the MTC device 115 of FIGS. 1, 2, 3, and/or 4. The relay device 120-d may be an example of the relay device 120 of FIGS. 1, 3, and/or 4. The base station 105-e, which may be a cellular base station, eNB, or WLAN access point, may be an example of base station 105 of FIGS. 1, 2, 3, and/or 4.

In some embodiments, an MTC device 115-h may determine a first narrow frequency band for discovery 605, for example based on a device ID of the MTC device 115-h. In some cases, the first narrow frequency band may be predefined, for example by the device ID of the MTC device 115-h or by the MTC server 210, base station 105-e, and/or the relay device 120-d. In other cases, the first narrow frequency band may be randomly selected by the MTC device 115-h, such as from a list of available frequency bands. The MTC device 115-h may participate in a discovery process 610 with the relay device 120-d utilizing the determined first narrow frequency band. Participating in the discovery process 610 may include sending, by the MTC device 115-h, one or more discovery signals to the relay device 120-d, and receiving a response message from the relay device 120-d indicating that the relay device 120-d is available to serve as a relay. The relay device 120-d may then determine a second narrow frequency band to establish a link 615 with the MTC device 115-h to facilitate relaying communications to the base station 105-e. In other embodiments, the MTC device 115-h either alone or in combination with the relay device 120-d, may determine the second narrow frequency band for the link establishment between the MTC device 115-h and the relay device 120-d. In some cases, the second narrow frequency band may be predefined, for example by the MTC device 115-h, the MTC server 210, base station 105-e, and/or the relay device 120-d. The relay device 120-d and the MTC device 115-h may then establish the link, which may also be referred to as an access link, over the second narrow frequency band 620. In some cases, the first and second narrow frequency bands may be the same. The first or second narrow frequency bands may be common to a plurality of devices, such as MTC devices 115 and may be predetermined for discovery and/or communications with MTC devices 115.

In some embodiments 120-*d*, the relay device 120-*d* may establish a broad frequency band link 630 to enable the relay device 120-*d* to relay communications from the MTC device 115-*h* to the base station 105-*e*. Establishing the broad frequency band link 630 may include performing synchronization with the base station 105-*e*. In some cases, the broad frequency band link between the relay device 120-*d* and the base station 105-*e* may be referred to as a relay link. Once the access link has been established 620 between the MTC device 115-*h* and the relay device 120-*d* and the relay link has been established 630 between the relay device 120-*d* and the base station 105-*e*, the MTC device 115-*h* may then perform communications with the base station 105-*e* through the relay device 120-*d*. In particular, the MTC device 115-*h* may first transmit data over the narrow frequency band link 635 to the relay device 120-*d*. The relay device 120-*d* may concurrently or subsequently, relay data over the broad frequency band link 640 to the base station 105-*e*.

In some embodiments, participating in the discovery process 610 and/or establishing the narrow frequency band or access link 620 may be carried out over link 145 described in reference to FIGS. 1 and/or 3, and/or over the first narrow frequency band 405 described in reference to FIGS. 4 and/or 5. In some the embodiments, establishing the narrow frequency band or access link 620 and/or transmitting data over the narrow frequency band link to be relayed 635 may be carried out over link 145 described in reference to FIGS. 1 and/or 3, and/or over the second narrow frequency band 410 described in reference to FIGS. 4 and/or 5. Establishment of the broad frequency band or relay link 630 and/or relaying data over the broad frequency band link 640 may be carried out over link 130 described in reference to FIGS. 1 and/or 3, and/or over the broad frequency band 415 described in reference to FIGS. 4 and/or 5.

Figure 7:
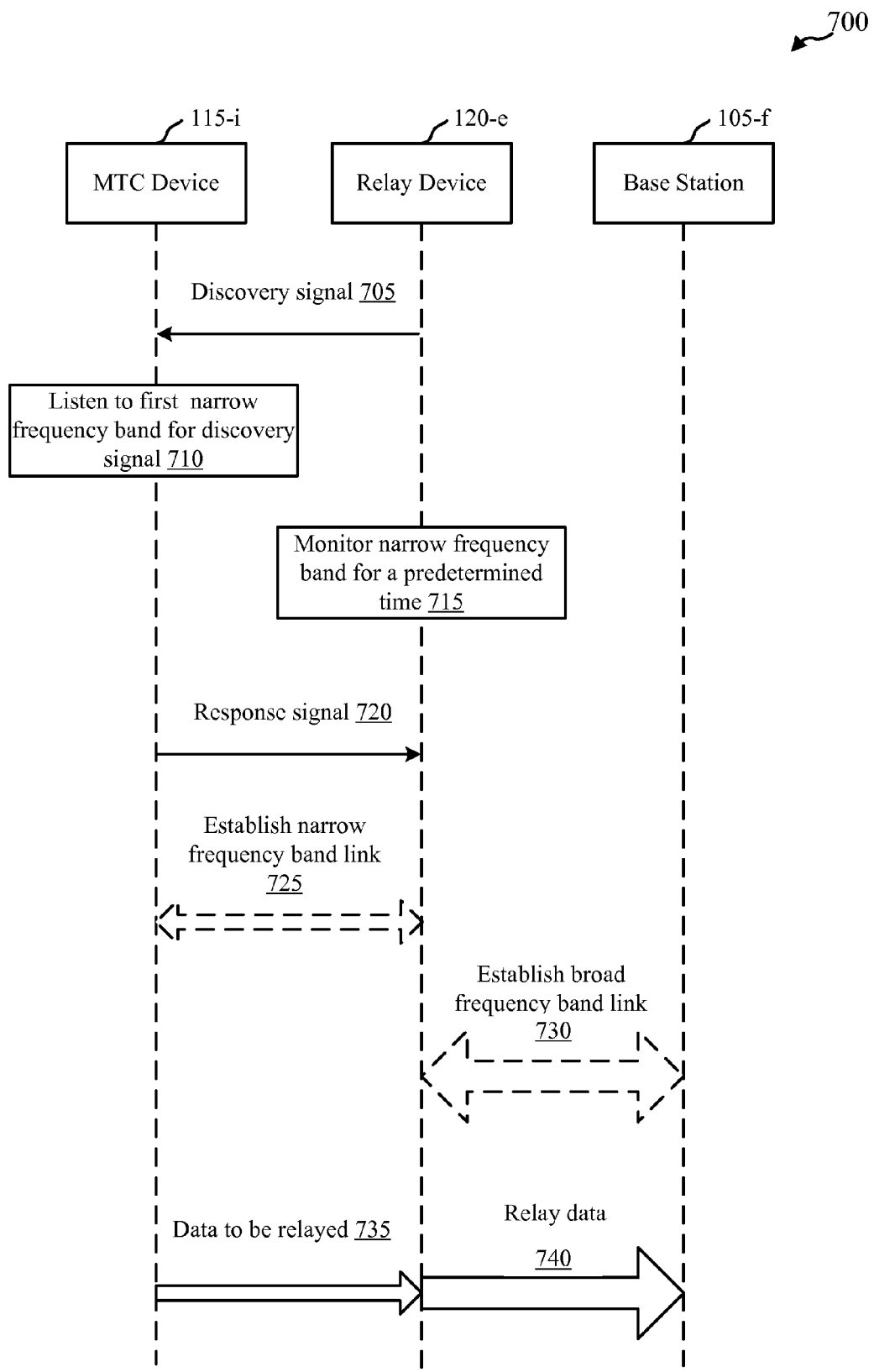
FIG. 7 shows another flow diagram for relaying communications of an MTC device through a relay device over a narrow frequency band to a base station on a broad frequency band in accordance with various embodiments.

Turning next to FIG. 7, a flow diagram 700 illustrates an example of an MTC device 115-*i* for relaying communications to a base station 105-*f* through a relay device 120-*e* in accordance with various embodiments. The MTC device 115-*i* may be an example of the MTC device 115 of FIGS. 1, 2, 3, 4, and/or 6. The relay device 120-*e* may be an example of the relay device or UE 120 of FIGS. 1, 3, 4, and/or 6. The base station 105-*f*, which may be a cellular base station, eNB, or WLAN access point, may be an example of base station 105 of FIGS. 1, 2, 3, 4, and/or 6.

In some embodiments, a relay device 120-*e* may send one or more discovery signals 705 to an MTC device 115-*i*, for example, if the relay device 120-*e* detects that the MTC device 115-*s* is nearby and/or has data to transmit to a base station 105-*f* and/or MTC server 210. In other cases, the base station 105-*f*, for example acting at the direction of an MTC server 210, may communicate to the relay device 120-*e* that it has data to transmit and/or wants to establish relay communications with the MTC device 115-*i*. The relay device 120-*e* may send a discovery signal 705 to the MTC device 115-*i* over a first narrow frequency band, which may be common to a plurality of MTC devices 115. In some cases, the relay device 120-*e* may broadcast the discovery signal on the common narrow frequency band to multiple MTC devices 115, or may transmit the discovery signal on multiple narrow frequency bands either simultaneously or one at a time to one or more MTC devices 115.

The MTC device 115-*i* may be listening on the first narrow band frequency 710, which may be a predetermined narrow frequency band for discovery purposes. After the discovery signal is sent 705 by the relay device 120-*e*, the relay device 120-*e* may monitor one or more narrow frequency bands, such as a first and/or a second narrow frequency band for a predetermined time 715 for a response from the MTC device 115-*i*. After receiving the discovery signal 705 sent by the relay device 120-*e*, the MTC device 115-*i* may then send a response signal 720 to the relay device 120-*e* to indicate confirmation of the relay. In some cases, if the discovery signal 705 was sent over a common narrow frequency band, the MTC device 115-*i* may send the response signal 720 over a second narrow frequency band different from the common narrow frequency band. In other cases, if the discovery signal 705 sent by the relay device 120-*e* was over a first narrow frequency band not common to multiple MTC devices 115, the MTC may send the response signal 720 over the same first narrow frequency band. The MTC device 115-*i* and the relay device 120-*e* may then establish a narrow frequency band or access link 725 over the second narrow frequency band. In some cases, the first and second narrow frequency bands may be the same.

The relay device 120-*e* may establish a broad frequency band or relay link 730 with the base station 105-*f*. In some cases, the first and/or second narrow frequency bands may be a subset of the broad frequency band. Once the access link 725 has been established between the MTC device 115-*i* and the relay device 120-*e* and the relay link 730 has been established between the relay device 120-*e* and the base station 105-*f*, the MTC device 115-*i* may then transmit data to the base station 105-*f* through the relay device 120-*e*. In particular, the MTC device 115-*i* may transmit data over the second narrow frequency band link to be relayed 735 to the base station 105-*f*. The relay device 120-*e* may relay the data over the broad frequency band link 740 to the base station 105-*f*.

In some embodiments, sending one or more discovery signals 705, sending the response signal 720, and/or establishing the narrow frequency band or access link 725 may be carried out over link 145 described in reference to FIGS. 1 and/or 3, and/or over the first narrow frequency band 405 described in reference to FIGS. 4 and/or 5. In some the embodiments, establishing the narrow frequency band or access link 725 and/or transmitting data over the narrow frequency band link to be relayed 735 may be carried out over link 145 described in reference to FIGS. 1 and/or 3, and/or over the second narrow frequency band 410 described in reference to FIGS. 4 and/or 5. Establishment of the broad frequency band or relay link 730 and/or relaying data over the broad frequency band link 740 may be carried out over link 130 described in reference to FIGS. 1 and/or 3, and/or over the broad frequency band 415 described in reference to FIGS. 4 and/or 5.

Figure 8:
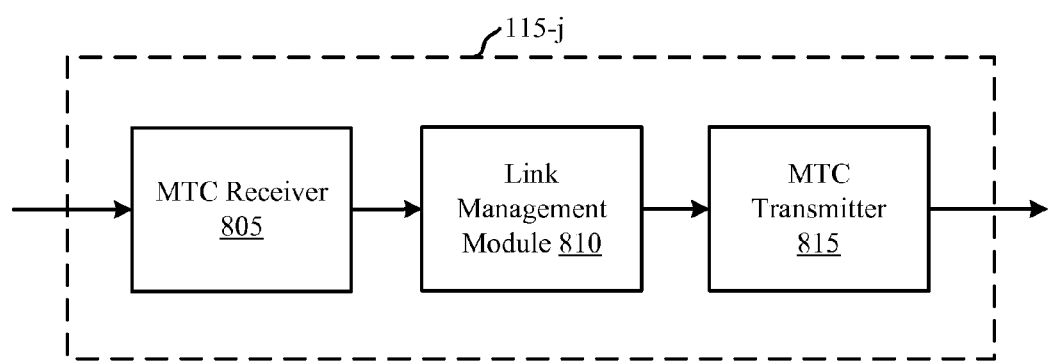
FIG. 8 is a block diagram illustrating an MTC device configured for utilizing a relay device in accordance with various embodiments.

FIG. 8 shows a block diagram 800 of a device 115-*j*, which may be an MTC device 115, for relaying communications to a base station 105 through a relay device 120 in accordance with various embodiments. The device 115-*j* may be an example of one or more aspects of the MTC device 115 described above with reference to FIGS. 1, 2, 3, 4, 6, and/or 7. The MTC device 115-*j* may communicate with a relay device 120 and/or a base station 105 via links 145 and/or 125 as described in reference to FIGS. 1 and/or 3 over frequency bands 405 and/or 410 described in reference to FIGS. 4 and/or 5. The device 115-*j* may include an MTC receiver 805, a link management module 810, and/or an MTC transmitter 815. Each of these components may be in communication with each other.

The MTC receiver 805 may receive information such as packet, data, and/or signaling information regarding what the device 115-*j* has received or transmitted. The received information may be utilized by the link management module 810 for a variety of purposes. In some cases, the MTC receiver 805 may be configured to receive data or transmissions, for example from a relay device 120, to further enable the various techniques described above for relaying communications to a base station 105 through a relay device 120.

The MTC transmitter 815 may similarly transmit information such as packet, data, and/or signaling information from the device 115-*j*. In some cases, the MTC transmitter 815 may be configured to send uplink data according to various embodiments described herein, such to a base station 105 through a relay device 120.

In one embodiment, the MTC receiver 805 may be configured to receive one or more discovery signals from a relay device 120 over a first narrow frequency band. The MTC receiver 805 may then communicate the one or more discovery signals to the link management module 810. The link management module 810 may configure a response message to the one or more received discovery signals, such as to request the relay device 120 to serve as a relay for uplink communications to a base station 105. The link management module 810 may communicate the response message to the MTC transmitter 815. The transmitter 815 may transmit the response message to the relay device 120 over the first or a second narrow frequency band.

In some cases, when the MTC device 115-*j* initiates the discovery process with the relay device 120, the link management module 810 may configure one or more discovery signals to be transmitted to a relay device 120. The link management module 810 may communicate the discovery signals to the MTC transmitter 815. The transmitter 815 may broadcast the discovery signals to one or more relay devices 120 over a first narrow frequency band. In this scenario, the MTC receiver 805 may then receive confirmation from one or more relay devices 120 that they are available to serve as a relay. The confirmation may be received over the first or a second narrow frequency band.

Following the discovery process, the link management module 810 may compile and/or configure data to be relayed through the relay device 120 to a base station 105. The link management module 810 may communicate the data to the MTC transmitter 815 to send to the relay device 120 over a second narrow frequency band.

Figure 9:
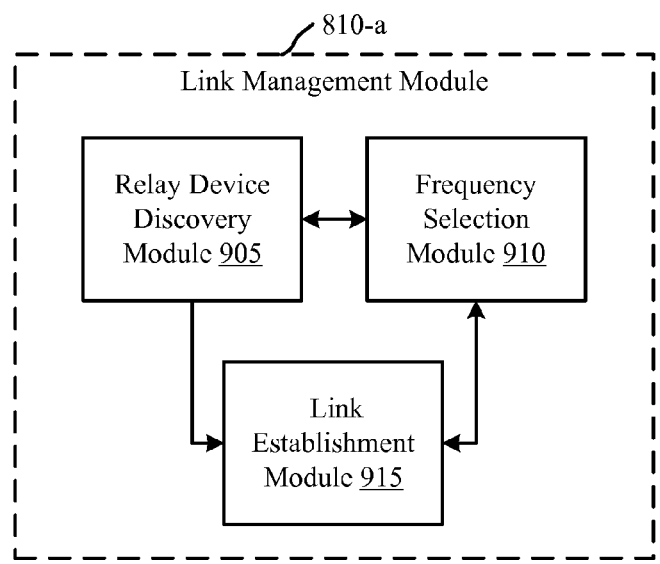
FIG. 9 is a block diagram illustrating one embodiment of a link management module of FIG. 8 in accordance with various embodiments.

FIG. 9 is a block diagram 900 illustrating one embodiment of a link management module 810-*a*. The link management module 810-*a* may be an example of the link management module 810 of FIG. 8. In one example, the link management module 810-*a* may include a relay device discovery module 905, a frequency selection module 910, and/or a link establishment module 915.

The relay device discovery module 905 may configure and coordinate discovery communications with a relay device 120 via the MTC transmitter and receiver 815, 805 of device 115-*j* as described in reference to FIG. 8. This may include configuring discovery signals and/or discovery response signals as described in greater detail in reference to FIGS. 4, 5, 6, and/or 7 above.

In some embodiments, the frequency selection module 910 may operate in conjunction with the relay device discovery module 905 to coordinate the discovery process with a relay device 120. For example, when the MTC device 115-*j* initiates discovery with a relay device 120, the frequency selection module may select a first narrow frequency band on which to transmit a discovery request. In another example, when the relay device 120 initiates discovery, the frequency selection module 910 may select a narrow frequency band, such as a first or second narrow frequency band, upon which to respond to the discovery signal. The discovery signal may be broadcast from the relay device 120 to multiple MTC devices 115 over a first common narrow frequency band. In this scenario, the frequency selection module 910 may select a second narrow frequency band to send a response signal. In another scenario, the relay device 120 may transmit multiple discovery signals on multiple narrow frequency bands, such that the MTC device 115-*j* receives a discovery signal on a first narrow frequency band. The frequency selection module 910 may then select the same first narrow frequency band to transmit the response. The frequency selection module 910 may coordinate with the relay device discovery module 905, the MTC receiver 805 and/or the MTC transmitter 815 of MTC device 115-*j* to effectuate discovery.

Once discovery with a relay device 120 is complete, the relay device discovery module 905 may communicate to the frequency selection module 910 and the link establishment module 915 that a communication link may be established.

The frequency selection module 910 may determine one or more narrow frequency bands on which the MTC device 115-*j* will communicate MTC data to the relay device 120. In some cases, selection of a narrow frequency band for MTC data communications may be determined based on which narrow frequency band(s) was used for discovery. The frequency selection module 910 may communicate narrow frequency band information to the link establishment module 915.

The link establishment module 915 may coordinate with the MTC transmitter 815 and the MTC receiver 805 to establish a peer to peer connection (P2P) with the relay device 120 over the narrow frequency band selected by the frequency selection module 910. The link establishment module 915 may communicate with the MTC transmitter 815 to send uplink data over a narrow frequency band, to the relay device 120.

Figure 10:
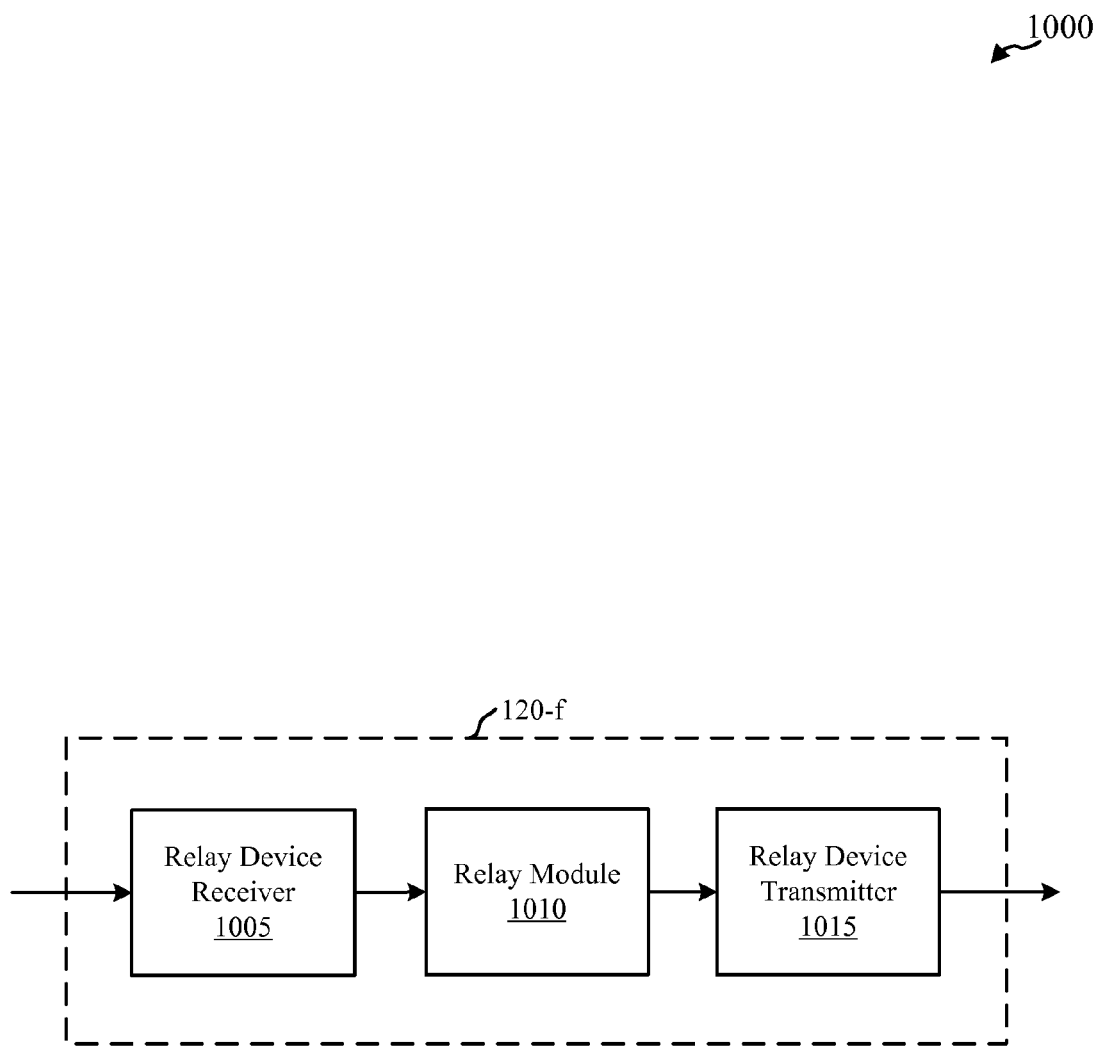
FIG. 10 is a block diagram illustrating a relay device for relaying MTC communications in accordance with various embodiments.

FIG. 10 shows a block diagram 1000 of a device 120-*f*, which may be a relay device, for relaying communications from an MTC device 115 to a base station 105 in accordance with various embodiments. The device 120-*f* may be an example of one or more aspects of the relay device 120 described above with reference to FIGS. 1, 3, 4, 6, and/or 7. The relay device 120-*f* may communicate with an MTC device 115 and/or a base station 105 via links 145, 130 as described in reference to FIGS. 1 and/or 3 over frequency bands 405, 410, and/or 415 described in reference to FIGS. 4 and/or 5. The relay device 120-*f* may include a relay device receiver 1005, a relay module 1010, and/or a relay device transmitter 1015. Each of these components may be in communication with each other.

The relay device receiver 1005 may receive information such as packet, data, and/or signaling information regarding what the device 120-*f* has received or transmitted. The received information may be utilized by the relay module 1010 for a variety of purposes. In some cases, the relay device receiver 1005 may be configured to receive data or transmissions, for example from an MTC device 115 and/or a base station 105, to further enable the various techniques described above for relaying communications from an MTC device 115 to a base station 105.

The relay device transmitter 1015 may transmit information such as packet, data, and/or signaling information from the device 120-*f*. In some cases, the relay device transmitter 1015 may be configured to relay data received from an MTC device 115 to a base station 105.

The relay device receiver 1005 may receive one or more discovery signals from an MTC device 115 over a first and/or second narrow frequency band. The relay device receiver 1005 may communicate the one or more discovery signals to the relay module 1010. The relay module 1010 may configure a response message indicating that the device 120-*f* is available to serve as a relay for the MTC device 115. The response message may be transmitted to the MTC device 115 over the first or second narrow frequency band.

In other embodiments, device 120-*f* may initiate discovery with an MTC device 115. In this case, the relay module 1010 may configure one or more discovery signals and communicate the discovery signals to the relay device transmitter 1015. The discovery signals may be transmitted to the MTC device 115 over a first narrow frequency band. In one embodiment, the first narrow frequency band may be a common narrow frequency band for multiple MTC devices 115. The relay device receiver 1005 may receive a request to serve as a relay from an MTC device 115.

Once the relay relationship has been confirmed between the relay device 120-*f* and the MTC device 115, the relay device receiver 1005 may receive data from the discovered MTC device 115 on a narrow frequency band. The relay device receiver 1005 may communicate the data to the relay module 1010, whereby the relay module 1010 may configure the data to be transmitted to the base station 105 over a broad frequency band. The relay module 1010 may communicate the data to be relayed to the relay device transmitter 1015. The data may be relayed to the base station 105 over the broad frequency band.

Figure 11:
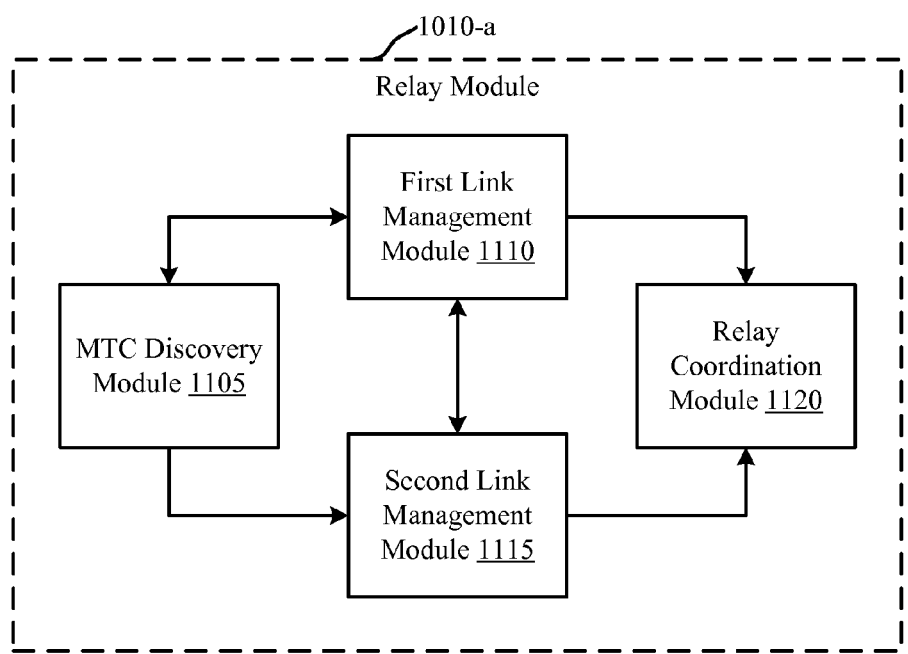
FIG. 11 is a block diagram illustrating one embodiment of a relay module of FIG. 10 in accordance with various embodiments.

FIG. 11 is a block diagram 1100 illustrating one embodiment of a relay module 1010-*a*. The relay module 1010-*a* may be an example of the relay module 1010 of FIG. 10. In one example, the relay module 1010-*a* may include an MTC discovery module 1105, a first link management module 1110, a second link management module 1115, and/or a relay coordination module 1120.

In particular, the MTC discovery module 1105 may, configure one or more discovery messages to be communicated to an MTC device 115 to establish a first communication link with the MTC device 115 over a first and/or second narrow frequency band. The first communication link may be an example of link 145 as described above in reference to FIGS. 1 and/or 3 over frequency bands 405 and/or 410 as described above in reference to FIGS. 4 and/or 5. As the discovery process has already been described in detail above in reference to FIGS. 4, 5, 6, and 7, for the sake of brevity, it will not be described again here.

Once the device 120-*f* and the MTC device 115 have discovered each other, the MTC discovery module 1105 may communicate to the first link establishment module 1110 and the second link establishment module 1115 to initialize links for relaying data from the MTC device 115 to a base station 105. The first link establishment module 1110 may establish a first link with the MTC device 115 over a narrow frequency band. The first communication link may be an example of link 145 as described above in reference to FIGS. 1 and/or 3 over frequency bands 405 and/or 410 as described above in reference to FIGS. 4 and/or 5. The second link establishment module 1115 may establish a second link with the base station 105. The second link may be an example of link 130 as described above in reference to FIGS. 1 and/or 3 over frequency band 415 as described above in reference to FIGS. 4 and/or 5.

Once the first and second links are established, the first and second link establishment modules 1110, 1115 may indicate to the relay coordination module 1120 to begin relaying data from the MTC device 115 to the base station 105. The relay coordination module 1120 may receive data to be relayed from the MTC device 115 over a narrow frequency band. The data may be relayed to the base station 105 over the broad frequency band. In one configuration, the relay device receiver 1005 may receive data from the MTC device 115 over the first link via a narrow frequency band and the relay device transmitter 1015 may transmit data to the base station 105 over the second link via a broad frequency band.

Figure 12:
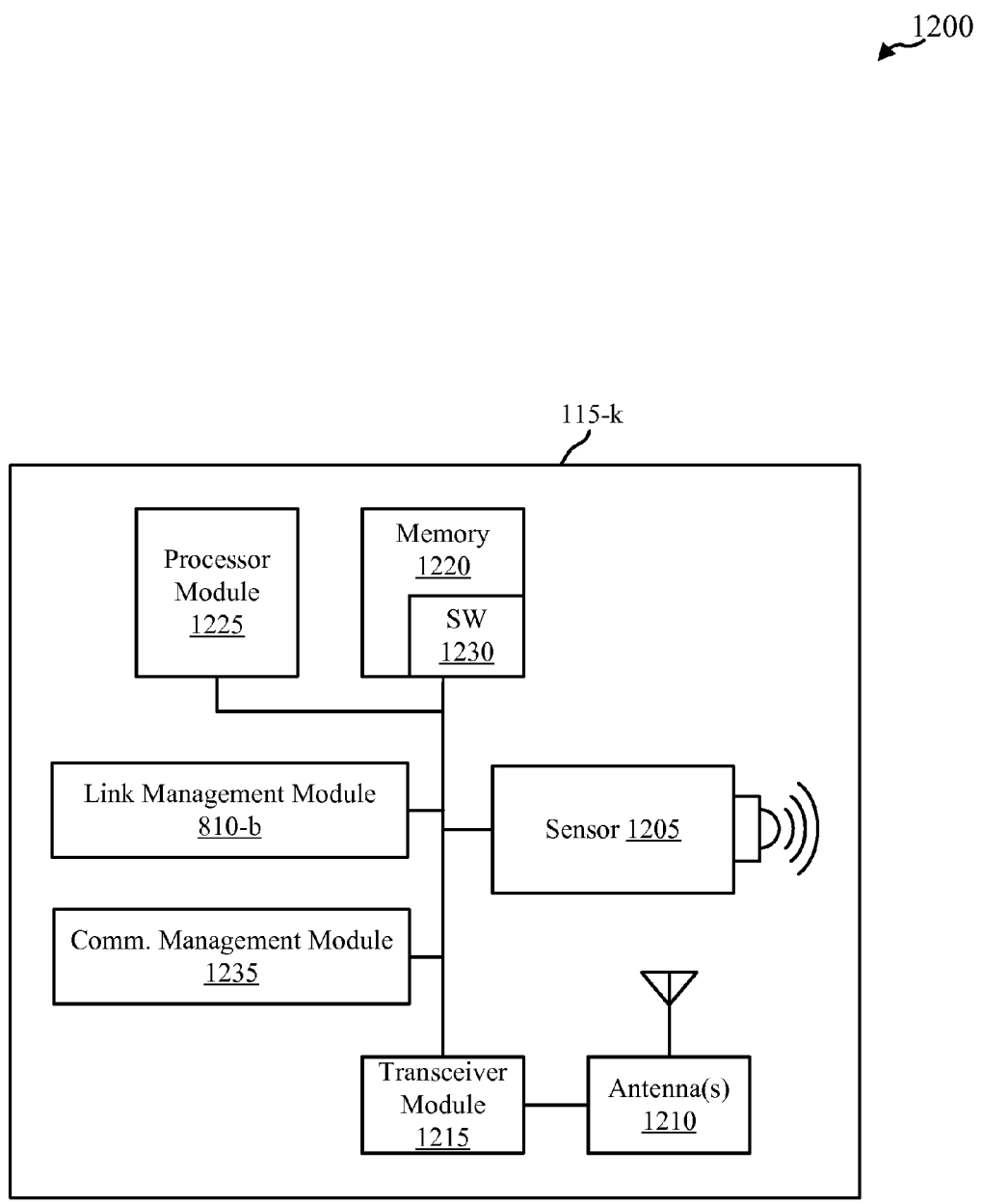
FIG. 12 shows a block diagram of an MTC device that may be configured for utilizing a relay device in accordance with various embodiments.

FIG. 12 is a block diagram 1200 of an MTC device 115-*k* configured for sending communications, and particularly uplink communications, to a base station 105 through a relay device 120 in accordance with various embodiments. The MTC device 115-*k* may have any of various configurations, such as a sensor or monitor 1205 for various MTC applications discussed above. The MTC device 115-*k* may have an internal power supply (not shown), such as a small battery, to facilitate mobile operation. In some embodiments, the MTC device 115-*k* may be an example of and/or incorporate one or more aspects of the MTC device 115 of FIGS. 1, 2, 3, 4, 6, 7, 8, and/or 9. The MTC device 115-*k* may be a multi-mode mobile device. The MTC device 115-*k* may be referred to as an MTC UE or M2M device in some cases.

The MTC device 115-*k* may include a link management module 810-*b*, antenna(s) 1210, a transceiver module 1215, memory 1220, and a processor module 1225, which each may be in communication, directly or indirectly, with each other (e.g., via one or more buses). The transceiver module 1215 may be configured to communicate bi-directionally, via the antenna(s) 1210 and/or one or more wired or wireless links, with one or more networks, as described above. For example, the transceiver module 1215 may be configured to communicate bi-directionally with relay devices 120 of FIGS. 1, 3, 4, 6, 7, 9, and/or 10 and/or base stations 105 of FIGS. 1, 2, 3, 4, 6, and/or 7. The transceiver module 1215 may include a modem configured to modulate the packets and provide the modulated packets to the antenna(s) 1210 for transmission, and to demodulate packets received from the antenna(s) 1210. While the MTC device 115-*k* may include a single antenna 1210, the MTC device 115-*k* may include multiple antennas 1210 for multiple transmission links.

The memory 1220 may include random access memory (RAM) and read-only memory (ROM). The memory 1220 may store computer-readable, computer-executable software code 1230 containing instructions that are configured to, when executed, cause the processor module 1225 to perform various functions described herein (e.g., data capture, database management, message routing, etc.). Alternatively, the software code 1230 may not be directly executable by the processor module 1225 but be configured to cause the computer (e.g., when compiled and executed) to perform functions described herein.

The processor module 1225 may include an intelligent hardware device, e.g., a central processing unit (CPU) such as an ARM® based processor or those made by Intel® Corporation or AMD®, a microcontroller, an application specific integrated circuit (ASIC), etc.

According to the architecture of FIG. 12, the MTC device 115-*k* may further include a communications management module 1235. The communications management module 1235 may manage communications with base stations 105, other MTC devices 115, and/or relay devices 120. By way of example, the communications management module 1235 may be a component of the MTC device 115-$k$ in communication with some or all of the other components of the MTC device 115-$k$ via a bus. Alternatively, functionality of the communications management module 1235 may be implemented as a component of the transceiver module 1215, as a computer program product, and/or as one or more controller elements of the processor module 1225.

The components for MTC device 115-$k$ may be configured to implement aspects discussed above with respect to devices 115 of FIGS. 1, 2, 3, 4, 6, 7, 8, and/or 9 and may not be repeated here for the sake of brevity. For example, the link management module 810-$b$ may include similar functionality as link management module 810 of FIGS. 8 and/or 9. The link management module 810-$b$ may enable the MTC device 115-$k$ to discovery and relay data to a relay device 120 on a first and second narrow frequency band, the data then relayed to the base station 105 by the relay device 120 via a broad frequency band.

In some embodiments, the transceiver module 1215 in conjunction with antenna(s) 1210, along with other possible components of MTC device 115-$k$, may receive transmissions from one or more relay devices 120 and may transmit uplink data to the base stations 105 or a core network 140 by relaying the data through one or more relay devices 120. In some embodiments, the transceiver module 1215, in conjunction with antennas 1210 along with other possible components of MTC device 115-$k$, may receive transmissions from one or more relay devices 120 and may transmit uplink data to base stations 105 or a core network 140 such that these devices or systems may utilize flexible waveforms.

In some embodiments, the MTC device 115-$k$ may not have a power amplifier. In other cases, the MTC device 115-$k$ may have a limited power amplifier. In either case, the communication range of the MTC device 115-$k$ may be limited. For this and other reasons, the ability of the MTC device 115-$k$ to communicate uplink information, for example to a base station 105 or MTC server 10, may be limited. As a result, the techniques described above for relaying communications from the MTC device 115-$k$ through a relay device 120 over a narrow frequency band to base station 105 over a broad frequency band may improve uplink communications for the MTC device 115-$k$.

Figure 13:
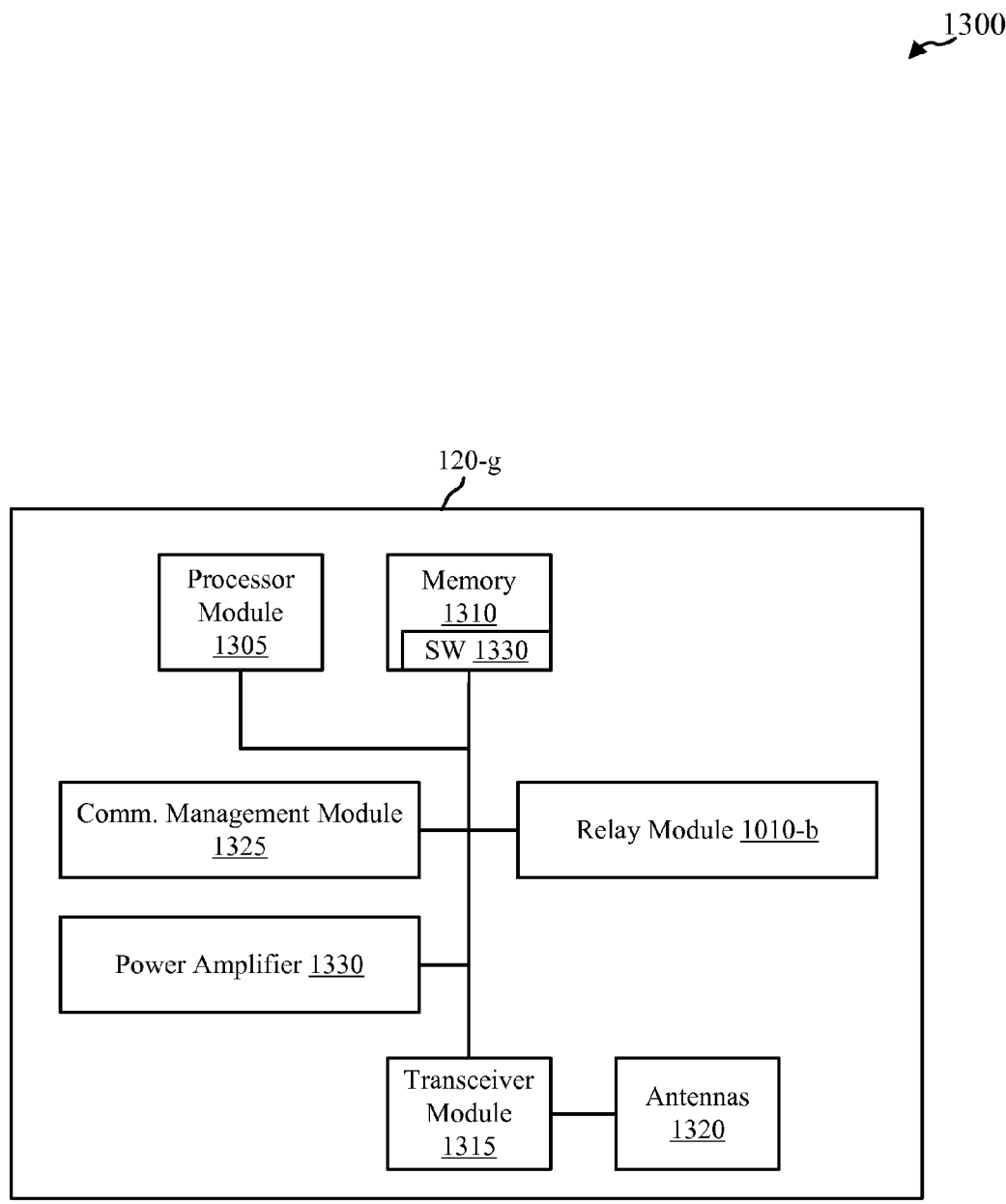
FIG. 13 shows a block diagram of a relay device that may be configured for relaying MTC communications in accordance with various embodiments.

FIG. 13 shows a block diagram 1300 of a relay device 120-$g$ configured for relaying communications from an MTC device 115 to a base station 105 in accordance with various embodiments. The relay device 120-$g$ may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The relay device 120-$g$ may in some cases have an internal power supply (not shown), such as a small battery, to facilitate mobile operation. In some embodiments, the relay device 120-$g$ may be an example of one or more aspects of one of the devices 120 described with reference to FIGS. 1, 3, 4, 6, 7, 10, and/or 11. The relay device 120-$g$ may be configured to implement at least some of the features and functions described with reference to FIGS. 4, 5, 6 and/or 7.

The relay device 120-$g$ may include a relay module 1010-$b$, a processor module 1305, a memory module 1310, at least one transceiver module 1315, at least one antenna 1320, and/or a communication management module 1325. Each of these components may be in communication with each other, directly or indirectly.

The memory module 1310 may include random access memory (RAM) and/or read-only memory (ROM). The memory module 1310 may store computer-readable, computer-executable software (SW) code 1330 containing instructions that are configured to, when executed, cause the processor module 1305 to perform various functions described herein for communicating over a wireless communications system. Alternatively, the software code 1330 may not be directly executable by the processor module 1305 but may be configured to cause the relay device 120-$g$ (e.g., when compiled and executed) to perform various of the functions described herein.

The processor module 1305 may include an intelligent hardware device, e.g., a central processing unit (CPU) such as an ARM® based processor or those made by Intel® Corporation or AMD®, a microcontroller, an ASIC, etc. The processor module 1305 may process information received through the transceiver module(s) 1315 and/or information to be sent to the transceiver module(s) 1315 for transmission through the antenna(s) 1320. The processor module 1305 may handle, alone or in connection with the communication management module 1325, various aspects of communicating over a wireless communications system and/or detecting a communications network.

The transceiver module(s) 1315 may include a modem configured to modulate packets and provide the modulated packets to the antenna(s) 1320 for transmission, and to demodulate packets received from the antenna(s) 1320. The transceiver module(s) 1315 may in some cases be implemented as one or more transmitter modules and one or more separate receiver modules. The transceiver module(s) 1315 may support communications in a first spectrum, such as a WWAN or cellular spectrum, and in a second spectrum, such as a WLAN spectrum. The transceiver module(s) 1315 may be configured to communicate bi-directionally, via the antenna(s) 1320, with one or more of the MTC devices 115 of FIGS. 1, 2, 3, 4, 6, 7, 8, and/or 9 and/or base stations 105 (e.g., eNBs and/or WLAN access points) described with reference to FIGS. 1, 2, 3, 4, 6, and/or 7. While the relay device 120-$g$ may include a single antenna, there may be embodiments in which the relay device 120-$g$ may include multiple UE antennas 1320.

The relay device 120-$g$ may also include a power amplifier 1330 that may allow the relay device 120-$g$ to communicate over longer distances, for example with more base stations 105, than, for example an MTC device 115. Because the relay device 120-$g$ may have a longer communication range than an MTC device 115, it may be beneficial for an MTC device 115 to relay communications via the relay device 120-$g$ to expand the base stations the MTC device 115 may communicate with, such as for example, that are greater distances from the MTC device 115.

The components of the relay device 120-$g$ may be configured to implement aspects discussed above with respect to devices 120 of FIGS. 1, 3, 4, 6, 7, 10 and/or 11 and may not be repeated here for the sake of brevity. For example, relay module 1010-$b$ may include similar functionality as the relay module 1010 of FIGS. 10 and/or 11. The relay module 1010-$b$ may enable the relay device 120-$g$ to discovery and relay data from an MTC device 115 over a first and second narrow frequency band to a base station 105 over a broad frequency band.

In some embodiments, the transceiver module 1315 in conjunction with antenna(s) 1320, along with other possible components of relay device 120-g, may receive transmissions from one or more MTC devices 115 and may relay uplink data from the MTC device 115 to base stations 105 or a core network 140. In some embodiments, the transceiver module 1315, in conjunction with antennas 1320 along with other possible components of relay device 120-g such as the power amplifier 1330, may allow the relay device 120-g to receive transmissions from one or more MTC devices 115 and transmit uplink data from the MTC device 115 to base stations 105 or a core network 140. In some cases, relay device 120-g, MTC device 115, base stations 105, and/or core network 140 may utilize flexible waveforms.

Figure 14:
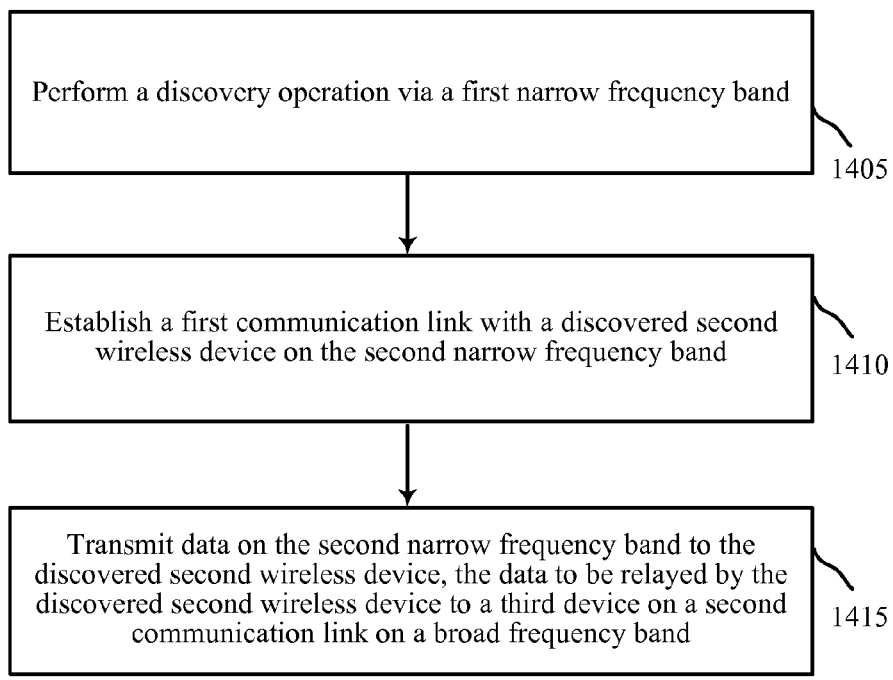
FIGS. 14-16 illustrate flowcharts of methods for relaying MTC communications in accordance with various embodiments.

FIG. 14 is a flow chart illustrating one example of a method 1400 for relaying communications from a first wireless device through a second wireless device to a third device in accordance with various embodiments. The first wireless device may be an MTC device 115. The second wireless device may be a relay device 120, and the third device may be a base station 105. For clarity, the method 1400 is described below with reference to one or more aspects of one of the devices 115 (e.g., an MTC device) described with reference to FIGS. 1, 2, 3, 4, 6, 7, 8, 9, and/or 12. In some embodiments, a device such as one of the devices 115 may execute one or more sets of codes to control the functional elements of the device 115 to perform the functions described below.

At block 1405, an MTC device 115 may perform a discovery operation via a first narrow frequency band. The operation(s) at block 1405 may in some cases be performed using the link management module 810 described in reference to FIGS. 8, 9, and/or 12, the relay device discovery module 905 and/or the frequency selection module 910 described in reference to FIG. 9, and/or the MTC receiver and/or transmitter 805, 815 described in reference to FIG. 8.

At block 1410, a first communication link with a discovered second wireless device may be established on the second narrow frequency band. The operation(s) at block 1410 may in some cases be performed using the link management module 810 described in reference to FIGS. 8, 9, and/or 12, the link establishment module 915 and/or the frequency selection module 910 described in reference to FIG. 9, and/or the MTC receiver and/or transmitter 805, 815 described in reference to FIG. 8.

At block 1415, the MTC device 115 may transmit data on the second narrow frequency band to the discovered second wireless device to be relayed to the third device on a second communication link on a broad frequency band. The operation(s) at block 1415 may in some cases be performed using the link management module 810 described in reference to FIGS. 8, 9, and/or 12, the link establishment module 915 and/or the frequency selection module 910 described in reference to FIG. 9, and/or the MTC receiver and/or transmitter 805, 815 described in reference to FIG. 8.

Thus, the method 1400 may provide for relaying communications from an MTC device 115 to a base station 105 through a relay device 120. It should be noted that the method 1400 is just one implementation and that the operations of the method 1400 may be rearranged or otherwise modified such that other embodiments are possible.

Figure 15:
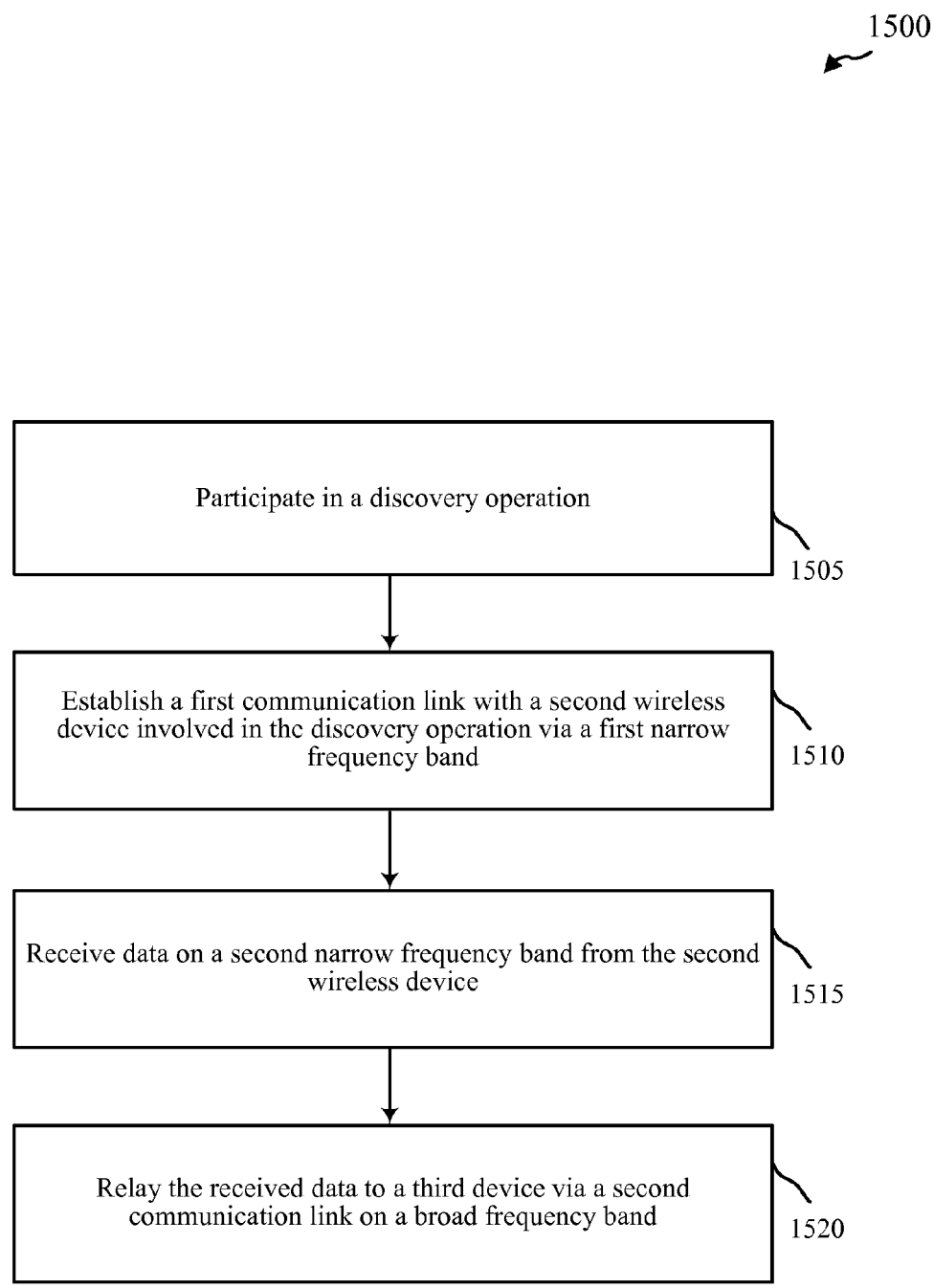

FIG. 15 is a flow chart illustrating one example of a method 1500 for a first wireless device to relay communications received from a second wireless device to a third device in accordance with various embodiments. The first wireless device may be a relay device 120. The second wireless device may be an MTC device 115, and the third device may be a base station 105. For clarity, the method 1500 is described below with reference to one or more aspects of one of the relay devices 120 described with reference to FIGS. 1, 3, 4, 6, 7, 10, 11, and/or 13. In some embodiments, a device such as one of the devices 120 may execute one or more sets of codes to control the functional elements of the device 120 to perform the functions described below.

At block 1505, the relay device 120 may participate in a discovery operation, for example with an MTC device 115. The operation(s) at block 1505 may in some cases be performed using the relay module 1010 described with reference to FIGS. 10, 11 and/or 13, the MTC discovery module 1105 described with reference to FIG. 11, and/or the relay device receiver and/or transmitter 1005, 1015 as described in reference to FIG. 10.

At block 1510, a first communication link with the second wireless device involved in the discovery operation may be established via a first narrow frequency band. The operation(s) at block 1510 may in some cases be performed using the relay module 1010 described with reference to FIGS. 10, 11 and/or 13, the MTC discovery module 1105 and/or the first link management module 1110 described with reference to FIG. 11, and/or the relay device receiver and/or transmitter 1005, 1015 as described in reference to FIG. 10.

At block 1515, the relay device 120 may receive data on a second narrow frequency band from the second wireless device. The operation(s) at block 1515 may in some cases be performed using the relay module 1010 described with reference to FIGS. 10, 11 and/or 13, the first link management module 1110 and/or the relay coordination module 1120 described with reference to FIG. 11, and/or the relay device receiver and/or transmitter 1005, 1015 as described in reference to FIG. 10.

At block 1520, the relay device 120 may relay the received data to the third device via a second communication link on a broad frequency band. The operation(s) at block 1520 may in some cases be performed using the relay module 1010 described with reference to FIGS. 10, 11 and/or 13, the first link management module 1110, the second link management module 1115, and/or the relay coordination module 1120 described with reference to FIG. 11, and/or the relay device receiver and/or transmitter 1005, 1015 as described in reference to FIG. 10.

Thus, the method 1500 may provide for relaying communications from an MTC device 115 to a base station 105 through a relay device 120. It should be noted that the method 1500 is just one implementation and that the operations of the method 1500 may be rearranged or otherwise modified such that other embodiments are possible.

Figure 16:
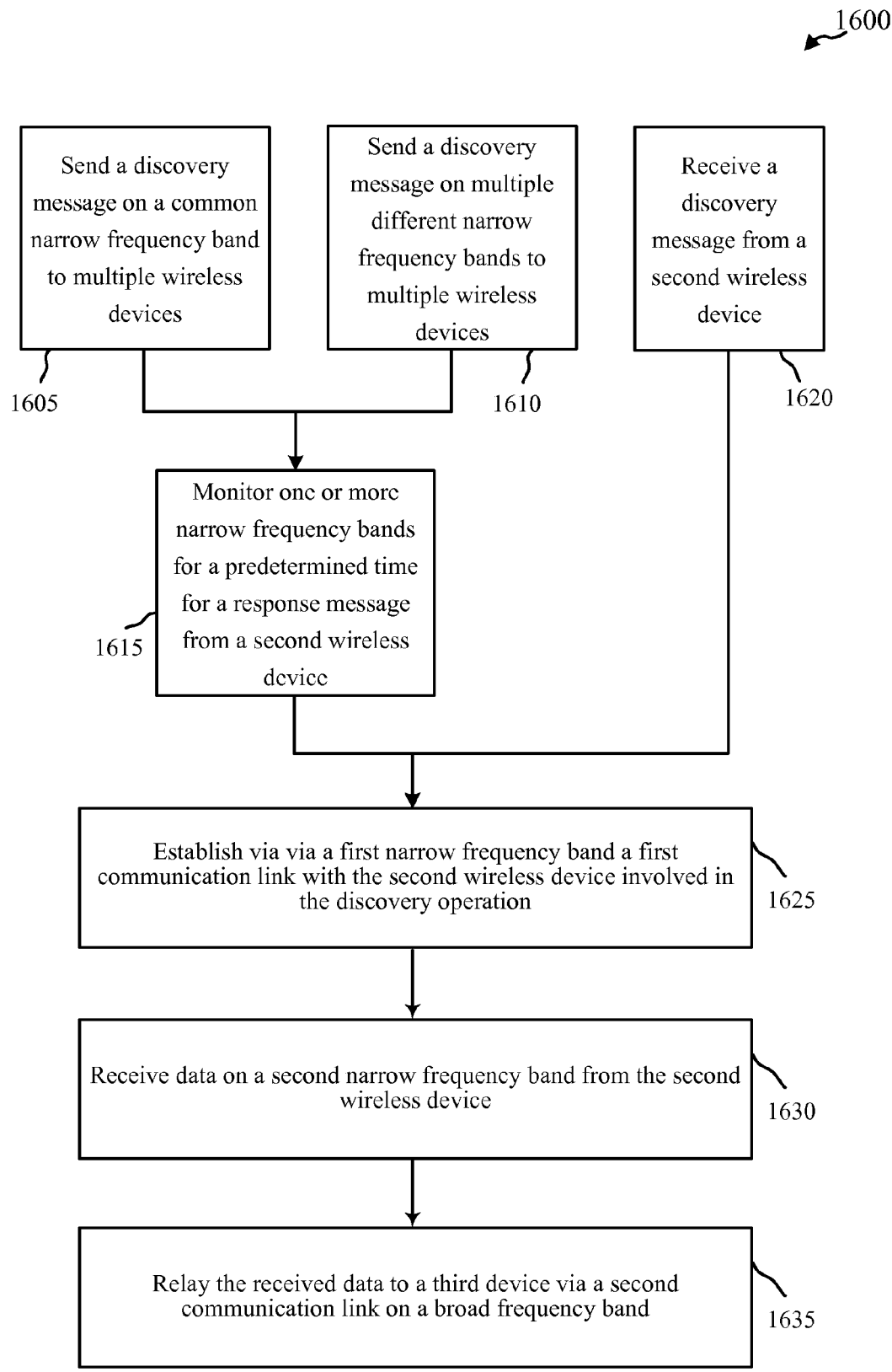

FIG. 16 is a flow chart illustrating one example of a method 1600 for a first wireless device to relay communications received from a second wireless device to a third device in accordance with various embodiments. The first wireless device may be a relay device 120. The second wireless device may be an MTC device 115, and the third device may be a base station 105. For clarity, the method 1600 is described below with reference to one or more aspects of one of the relay devices 120 described with reference to FIGS. 1, 3, 4, 6, 7, 10, 11, and/or 13. In some embodiments, a device such as one of the devices 120 may execute one or more sets of codes to control the functional elements of the device 120 to perform the functions described below.

At block 1605, the relay device 120 may send a discovery message on a common narrow frequency band to multiple wireless devices, such as multiple MTC devices 115. The operation(s) at block 1605 may in some cases be performed using the relay module 1010 described with reference to FIGS. 10, 11 and/or 13, the MTC discovery module 1105 described with reference to FIG. 11, and/or the relay device receiver and/or transmitter 1005, 1015 as described in reference to FIG. 10.

Alternatively to sending a discovery message on a common narrow frequency band to multiple wireless devices at block 1605, the relay device 120 may send a discovery message on multiple different narrow frequency bands to multiple wireless devices at block 1610. The operation(s) at block 1610 may in some cases be performed using the relay module 1010 described with reference to FIGS. 10, 11 and/or 13, the MTC discovery module 1105 and/or the first link management module 1110 described with reference to FIG. 11, and/or the relay device receiver and/or transmitter 1005, 1015 as described in reference to FIG. 10.

After block 1605 or block 1610, the relay device 120 may monitor one or more narrow frequency bands for a predetermined time for a response message from a second wireless device, such as an MTC device 115, at block 1615. The operation(s) at block 1615 may in some cases be performed using the relay module 1010 described with reference to FIGS. 10, 11 and/or 13, the MTC discovery module 1105 described with reference to FIG. 11, and/or the relay device receiver and/or transmitter 1005, 1015 as described in reference to FIG. 10.

In some cases, the second wireless device, such as an MTC device 115, instead of the relay device 120, may initiate the discovery operation, such that the relay device 120 may receive a discovery message from a second wireless device at block 1620. The operation(s) at block 1620 may in some cases be performed using the relay device receiver 1005 as described in reference to FIG. 10.

After the discovery operation performed at blocks 1605 and 1615, 1610 and 1615, or 1620, the relay device 120 may establish via a first narrow frequency band a first communication link with the second wireless device involved in the discovery operation at block 1625. The operation(s) at block 1625 may in some cases be performed using the relay module 1010 described with reference to FIGS. 10, 11 and/or 13, the MTC discovery module 1105 and/or the first link management module 1110 described with reference to FIG. 11, and/or the relay device receiver and/or transmitter 1005, 1015 as described in reference to FIG. 10.

At block 1630, the relay device 120 may receive data on a second narrow frequency band from the second wireless device. The operation(s) at block 1630 may in some cases be performed using the relay module 1010 described with reference to FIGS. 10, 11 and/or 13, the first link management module 1110 and/or the relay coordination module 1120 described with reference to FIG. 11, and/or the relay device receiver and/or transmitter 1005, 1015 as described in reference to FIG. 10.

At block 1635, the relay device 120 may relay the received data to a third device via a second communication link on a broad frequency band. The operation(s) at block 1635 may in some cases be performed using the relay module 1010 described with reference to FIGS. 10, 11 and/or 13, the first link management module 1110, the second link management module 1115, and/or the relay coordination module 1120 described with reference to FIG. 11, and/or the relay device receiver and/or transmitter 1005, 1015 as described in reference to FIG. 10.

Thus, the method 1600 may provide for relaying communications from an MTC device 115 to a base station 105 through a relay device 120. It should be noted that the method 1600 is just one implementation and that the operations of the method 1600 may be rearranged or otherwise modified such that other embodiments are possible. One or more aspects of the method 1400, 1500, and/or 1600 may in some cases be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3 GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3 GPP). CDMA2000 and UMB are described in documents from an organization named "3rd Generation Partnership Project 2" (3 GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method of wireless communication comprising:
performing, by a first wireless device, a discovery operation on a first narrow frequency band;
establishing a first communication link with a second wireless device on a second narrow frequency band; and
transmitting data on the second narrow frequency band to the second wireless device, the data to be relayed by the discovered second wireless device to a third device on a second communication link on a broad frequency band;
wherein at least one of the first narrow frequency band or the second narrow frequency band is a subset of the broad frequency band;
wherein the first communication link on the second narrow frequency band and the second communication link on the broad frequency band overlap in time.

2. The method of claim 1, wherein the first narrow frequency band and the second narrow frequency band are the same.

3. The method of claim 2, wherein the second narrow frequency band is common to a plurality of narrow frequency band wireless devices.

4. The method of claim 1, wherein at least one of the first narrow frequency band or the second narrow frequency band is predefined.

5. The method of claim 1, wherein at least one of the first narrow frequency band or the second narrow frequency band is randomly selected by the first wireless device.

6. The method of claim 1, wherein the first wireless device performs synchronization with the third device.

7. The method of claim 1, wherein the first wireless device is a machine type communication (MTC) device.

8. The method of claim 1, wherein the first communication link comprises an LTE-D connection.

9. The method of claim 1, wherein at least one of the first narrow frequency band or the second narrow frequency band comprises a bandwidth in the range of 1.4 MHz to 3 MHz.

10. The method of claim 1, wherein the broad frequency band comprises a bandwidth of approximately 5 MHz, 10 MHz, or 20 MHz.

11. The method of claim 1, wherein the second communication link on the broad frequency band comprises an LTE connection.

12. A machine type communications (MTC) device comprising:
a processor;
memory in electronic communication with the processor; and
instructions stored in the memory, the instructions being executable by the processor to:
perform a discovery operation on a first narrow frequency band;
establish a first communication link with a discovered second wireless device on a second narrow frequency band; and
transmit data on the second narrow frequency band to the discovered second wireless device, the data to be relayed by the discovered second wireless device to a third device on a second communication link on a broad frequency band;

wherein at least one of the first narrow frequency band or the second narrow frequency band is a subset of the broad frequency band;

wherein the first communication link on the second narrow frequency band and the second communication link on the broad frequency band overlap in time.

13. A method of wireless communication comprising:

participating, by a first wireless device configured to relay data on a broad frequency band, in a discovery operation establishing a first communication link with a second wireless device involved in the discovery operation on a first narrow frequency band;

receiving data on a second narrow frequency band from the second wireless device; and relaying the received data to a third device via a second communication link on the broad frequency band;

wherein at least one of the first narrow frequency band or the second narrow frequency band is a subset of the broad frequency band;

wherein the first communication link on the second narrow frequency band and the second communication link on the broad frequency band overlap in time.

14. The method of claim 13, further comprising:

sending a discovery message on the first narrow frequency band to initiate the discovery operation.

15. The method of claim 14, further comprising:

sending a discovery message on a common narrow frequency band to multiple wireless devices to initiate the discovery operation.

16. The method claim 14, further comprising:

sending a discovery message on multiple different narrow frequency bands to multiple wireless devices to initiate the discovery operation.

17. The method of claim 13, further comprising:

monitoring the first narrow frequency band for a predetermined time for a response message from the second wireless device.

18. The method of claim 13, wherein the first narrow frequency band and the second narrow frequency band are the same.

19. The method of claim 13, wherein the second wireless device is a machine type communication (MTC) device.

20. The method of claim 13, wherein the first communication link comprises an LTE-D connection.

21. The method of claim 13, wherein the second communication link comprises an LTE connection.

22. The method of claim 13, wherein at least one of the first narrow frequency band or the second narrow frequency comprises a bandwidth in the range of 1.4 MHz to 3 MHz.

23. The method of claim 13, wherein the broad frequency band comprises a bandwidth of approximately 5 MHz, 10 MHZ, or 20 MHz.

24. A device for relaying MTC data on a broad frequency band, comprising:

a processor;

memory in electronic communication with the processor; and instructions stored in the memory, the instructions being executable by the processor to:

participate in a discovery operation;

establish a first communication link with a second wireless device involved in the discovery operation on a first narrow frequency band;

receive data on a second narrow frequency band from the second wireless device; and relay the received data to a third device via a second communication link on a broad frequency band;

wherein at least one of the first narrow frequency band or the second narrow frequency band is a subset of the broad frequency band;

wherein the first communication link on the second narrow frequency band and the second communication link on the broad frequency band overlap in time.

* * * * *